United States Patent
Spence et al.

(10) Patent No.: US 7,895,209 B2
(45) Date of Patent: Feb. 22, 2011

(54) PRESENTATION OF INFORMATION BASED ON CURRENT ACTIVITY

(75) Inventors: Jeanine E. Spence, Seattle, WA (US); Kathleen Linscott, Seattle, WA (US); Scott Neilson, Seattle, WA (US); Wai Chan, Bellevue, WA (US); David M. Bozich, Enumclaw, WA (US); Craig Combel, Issaquah, WA (US); Rob Nichols, Gig Harbor, WA (US)

(73) Assignee: Microsoft Corporation, Redmond, WA (US)

( * ) Notice: Subject to any disclaimer, the term of this patent is extended or adjusted under 35 U.S.C. 154(b) by 174 days.

(21) Appl. No.: 11/518,672

(22) Filed: Sep. 11, 2006

(65) Prior Publication Data

US 2008/0065668 A1  Mar. 13, 2008

(51) Int. Cl.
*G06F 7/00* (2006.01)
*G06F 17/30* (2006.01)

(52) U.S. Cl. .................. 707/740; 707/796
(58) Field of Classification Search .............. None
See application file for complete search history.

(56) References Cited

U.S. PATENT DOCUMENTS

| | | | |
|---|---|---|---|
| 5,721,911 A * | 2/1998 | Ha et al. ............ 707/100 |
| 6,434,568 B1 | 8/2002 | Bowman-Amuah | |
| 6,701,345 B1 | 3/2004 | Carley et al. | |
| 7,013,290 B2 | 3/2006 | Ananian | |
| 7,299,202 B2 | 11/2007 | Swanson | |
| 7,689,583 B2 | 3/2010 | Bozich et al. | |
| 2002/0055924 A1 | 5/2002 | Liming | |
| 2003/0046639 A1 | 3/2003 | Fai et al. | |
| 2003/0131013 A1 * | 7/2003 | Pope et al. ............ 707/100 |
| 2003/0149941 A1 | 8/2003 | Tsao | |
| 2003/0179871 A1 * | 9/2003 | Ito et al. ............ 379/93.24 |
| 2003/0208493 A1 | 11/2003 | Hall et al. | |
| 2004/0249821 A1 * | 12/2004 | Nies et al. ............ 707/100 |
| 2005/0216482 A1 | 9/2005 | Ponessa | |
| 2006/0047665 A1 | 3/2006 | Neil | |
| 2006/0143220 A1 | 6/2006 | Spencer | |
| 2008/0065580 A1 | 3/2008 | Spence et al. | |
| 2008/0065675 A1 | 3/2008 | Bozich et al. | |

OTHER PUBLICATIONS

Hughes et al., "The Planetary Data System Data Model," IEEE, 1993.*
Nanard et al., "Integrating Knowledge-based Hypertext and Database for Task-oriented Access to Documents," Database and Expert Systems Applications, 1993.*
Quint e al., "Making structured documents active," University of Nottingham, 1998.*

* cited by examiner

*Primary Examiner*—Pierre M. Vital
*Assistant Examiner*—Rachel J Lee

(57) ABSTRACT

Data elevation architecture for automatically and dynamically surfacing to a user interface (UI) context-specific data based on specific workflow or content currently being worked on by a user. Data is broken down into data elements and stored at a data element level in a data catalog using metadata, attributes, and relationships. Data elements are automatically selected from a comprehensive collection of the data catalogs based on relevancy and correlation to the current user task. The data catalog stores and relates the data elements and metadata based on criteria specified by content matching based on business terms or specified in a business process in predefined relationships between forms or specified by the user as correlated. The UI displays the data automatically in forms dynamically selected, populated, and presented at the point of focus or user activity so that the user can interact or take action immediately.

20 Claims, 27 Drawing Sheets

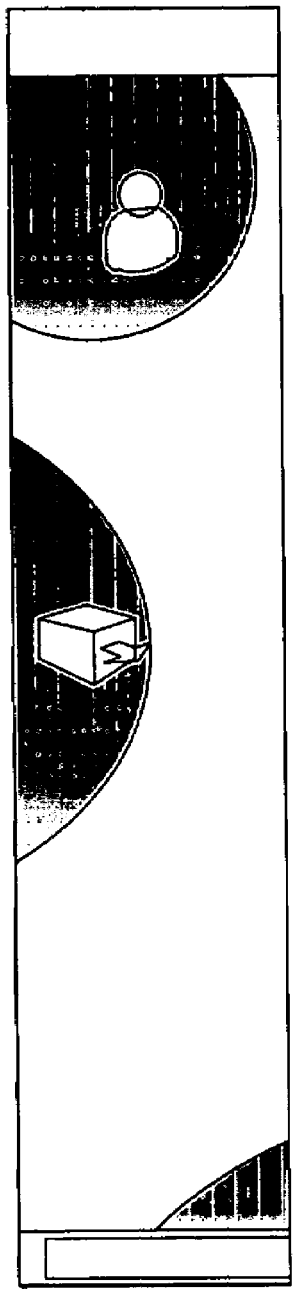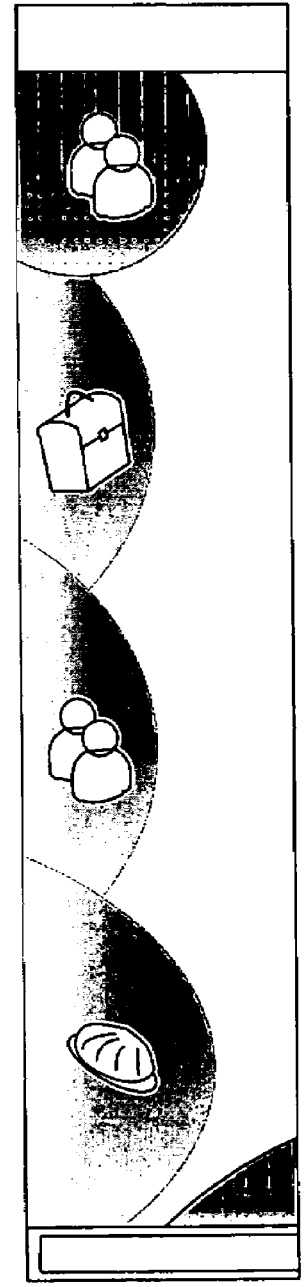
*FIG. 20*  *FIG. 21*

PRESENTATION OF INFORMATION BASED ON CURRENT ACTIVITY

BACKGROUND

Business users need to see information related to what they are working on at any point in time. What hinders information workers today is the often-complicated process of locating the right information needed to complete their work. This information is stored in multiple locations and in documents of varying formats-some documents that have been viewed or worked on by a specific user, and some of which other users have worked on. In spite of the promise of business process automation, rich application integration that could bridge these divergent stores and formats is inadequate or nonexistent for small to midsize companies. Core line-of-business (LOB) applications, for example, contain only a portion of the information needed to make a decision, such as associated with approving a purchase order, for example, where the full set of information related to a specific purchase order is stored in other locations and formats such as e-mail, text documents.

In the process of accomplishing work, users currently employ various cumbersome methods to compare, manage, produce, and track information in a constant flow of documents in order to obtain a full and rich view of all the information needed for that work or task. For example, oftentimes, personnel are required to rely on paper copies, tracking lists, tables containing a subset of information, and handwritten notes to track the flow of information from one location or file to another throughout their business processes. The worker searches for information within one application, finds one piece of information in one document, writes it on paper, then switches to another application, finds another piece of information, compares the two, and then decides if the information is related or just similar. The process is manual and prone to error requiring extra effort on the part of the user that is only a work-around to handle the limited, partial or nonexistent connections of information between applications.

Conventional systems are limited because of the lack of correlation and lack of an information model describing the relationships between the sets of data. Today's application display surfaces do all the work to govern the layout, interaction, and behavior of information. Within an individual application, some information describes the relationship of the data within one document to data within another document and the specific set of actions that can be taken on that information. However, there is little or no correlation of data between applications and, if there is correlation, it is usually manually created either through a process defined at design time or by the user at runtime. Even where correlation is made, it is at the full document level, and not for sets of data within a document. Lack of data correlation and efficient presentation thereof places a cognitive burden on the worker and frequently causes the inefficient duplication of effort.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a mechanism for the automatic and dynamic surfacing (or elevating) of context-specific data based on the specific relation of the data to the task in which the user is currently engaged (e.g., filling out a business form) in a user interface (UI). The solution is a means to manage data in sets that are smaller than the document (a subset) and to provide the specific and related data up to the work surface within the work environment of other sets of data to which it is related.

The process of "subsetting" the information, creating the relationships, and then bringing selected sets of data up to the user's workspace (or work surface) is referred to as "data elevation". Data elevation facilitates automatic selection and display of correlated and relevant data by connecting data elements through a set of automatically created links, and then recalling those links when the user creates a work context with similar data. This solution moves away from the conventional paradigm of the user needing to search or dig into documents or other data sources for needed context. The disclosed novel paradigm operates by at least connecting, organizing, and then automatically and dynamically elevating the needed content to the user.

Data is automatically and dynamically selected and elevated from a comprehensive collection of document data elements. The store for managing the data elements is called a data catalog. The data catalog organizes, correlates, and stores data elements and element metadata (information about the data elements). Data elements and metadata are related based on, for example, the worker's permissions and role, the worker's usage of the data in the past (e.g., repeated use of a specific phrase), and point in workflow (e.g., for a business application). Data elements can be obtained from documents, text entry in forms, file properties, content scraped from application screens, URL content, e-mail, instant messaging, and other sources. Each document has a data catalog, and aggregated data catalogs can be associated with a user (or worker), a business workflow, a project worked on by a group of workers. Accordingly, data handling and processing occurs at the data element level.

Additionally, the type of device and other device parameters can affect the selection of the data out of the catalog that will be displayed, and the order, position and size of its display in the UI. The data in the data catalog is prioritized so that when a small display device is used, a reduced set of data is elevated, and conversely, when a large, high resolution display is used, a larger set of data is elevated as well as more connections to other related data elements. The capabilities of the devices become part of the criteria for selecting the data that is to be displayed to the user.

In support thereof, the architecture disclosed and claimed herein comprises a computer-implemented system that facilitates data handling. The system includes a data component for providing a comprehensive collection of correlated data, and a data selection component for dynamically selecting and elevating relevant data, which can be a subset of the collection of correlated data, for presentation based in part on user activity. The comprehensive collection of correlated data includes many different data catalogs for different documents from which some or all data elements are elevated to the presentation surface based on user focus or task at hand.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 20 is a screenshot of data elevation for a left side workspace supply chain configuration and high-level categories of data elements that can appear and where they would appear.

FIG. 21 is a screenshot of data elevation for a left side workspace architecture configuration and high-level categories of data elements that can appear and where they would appear.

DETAILED DESCRIPTION

Figure 1:
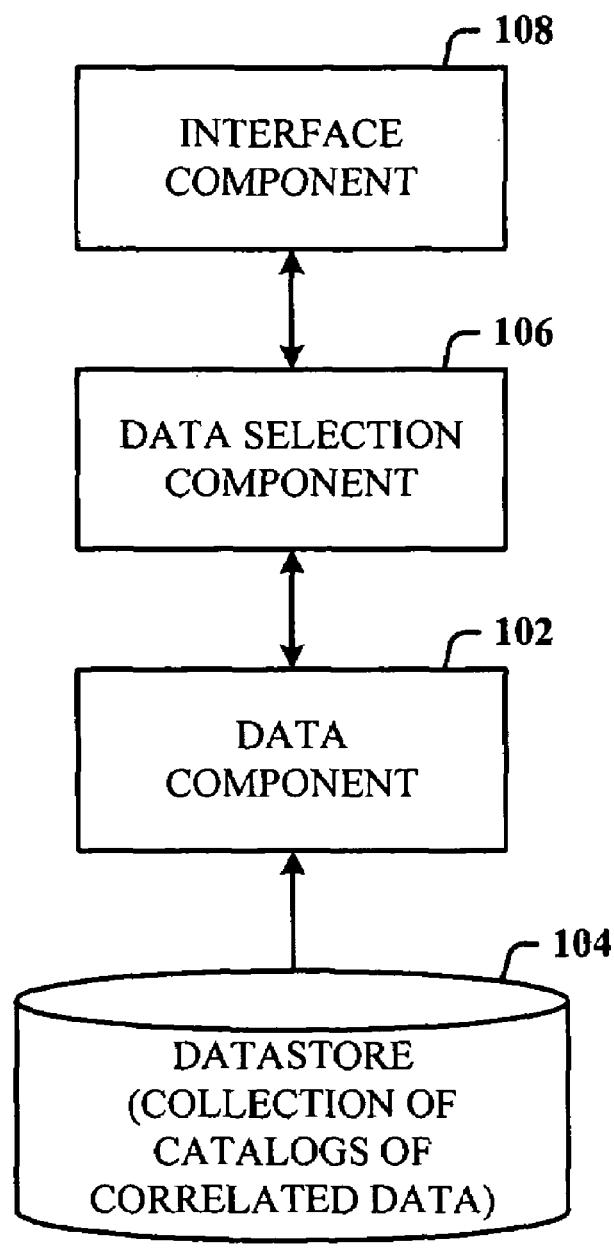
FIG. 1 illustrates a computer-implemented system that facilitates data handling in accordance with the disclosed data elevation architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture provides a mechanism for the automatic and dynamic elevation of data (or data elevation) based on a specific relation of the data to a task in which the user is currently engaged (e.g., filling out a business form) in a user interface (UI). Data elevation automatically displays relevant and correlated data (as defined by a data catalog of data elements) at the UI by elevating to the UI only those data elements most closely related to the current work and in this way provides what the user needs for that specific task. The solution is a means to manage data in sets (e.g., a subset) that are smaller than the document and to provide the specific and related data up to the work surface within the work environment of other sets of data to which it is related.

The process of selecting a subset of the information, creating relationships, and then bringing selected subsets of data up to the user's workspace (or work surface) is referred to as "data elevation". Data elevation facilitates automatic selection and display of correlated and relevant data by connecting data elements through a set of automatically created links, and then recalling those links when the user creates a work context with similar data. This solution moves away from the conventional paradigm of the user needing to search or dig into documents or other data sources for needed context. The disclosed novel paradigm operates by at least connecting, organizing, and then automatically and dynamically elevating the needed content to the user.

Data is automatically and dynamically selected and elevated from a comprehensive collection of document data elements. The store for managing the data elements is called a data catalog. The data catalog organizes, correlates, and stores data elements and element metadata (information about the data elements). Data elements and metadata are related based on, for example, the worker's permissions and role, the worker's usage of the data in the past (e.g., repeated use of a specific phrase), and point in workflow (e.g., for a business application). Data elements can be obtained from documents, text entry in forms, file properties, content gathered from application screens, URL (universal resource locator) content, e-mail, instant messaging, and other sources. Each document has a data catalog, and aggregated data catalogs can be associated with a user (or worker), a business workflow, a project worked on by a group of workers. Accordingly, data handling and processing occurs at the data element level.

Additionally, the device on which the content is being processed can be taken into consideration. The device type and other device parameters (e.g., display size, resolution) can affect the selection of the data out of the catalog that will be displayed, and the order, position and size of its display in the UI. The data in the data catalog is prioritized so that when a small display device is used, a reduced set of data is elevated, and conversely, when a large, high resolution display is used, a larger set of data is elevated as well as more connections to other related data elements. The capabilities of the devices become part of the criteria for selecting the data that is to be displayed to the user.

Benefits realized include a more contextual, unified work experience, where documents and other information are viewed within a matrix of related and relevant content. The immediacy of relevant information and information related to the relevant information reduces the need to search for information, which in turn reduces cognitive load on the information worker. Additionally, the implied history of activity and accessed information provides a historical context of elevated information, which provides an informal tracking mechanism from which the user can refine activities. The disclosed mechanism provides relevancy for workflow, transactional data, and a unified workspace that can present data/documents from different applications in a single interface as well.

Referring initially to the drawings FIG. 1 illustrates a computer-implemented system 100 that facilitates data handling in accordance with the disclosed data elevation architecture. The system 100 includes a data component 102 for providing a comprehensive collection of correlated data elements. Documents are decomposed into data catalogs of corresponding data elements. For example, a first document of an application can be broken down into a first data catalog of correlated data elements as defined by a document template. Similarly, a second document of the application can be broken down into a second data catalog of correlated data elements as defined by a different (or same) document template.

The data component 102 can be associated with a datastore 104 that stores a collection of data catalogs of correlated data elements, which data catalogs are specified by a schema that defines data relationships and attributes. Structured and unstructured data can be related via the data catalog. The data catalog will be described in greater detail infra.

The system 100 can also include a data selection component 106 for dynamically selecting and elevating a subset of the correlated data elements (form same or different data catalogs) for presentation at a display surface based in part on user activity. In other words, not all of the collection of data is surfaced for presentation to the user. Only data relevant to the task at hand or the user focus is surfaced. Additionally, data related to the surfaced relevant data can also be surfaced and presented or be elevated in preparation for presentation. It is intended that the terms "elevating", "data elevation", and "surfacing" are meant to be used interchangeably. Surfacing (or presentation) can be accomplished via an interface component 108 that receives and processes the subset of correlated data elements for presentation to a user. Document templates and dynamic forms can be part of the criteria for organizing the elevated relevant and related data for presentation.

Correlation is based on a number of factors associated with one or more of content, workflow process, and user settings. Examples include but are not limited to, specific business vocabulary, established keywords or phrases, forms in an application related by a predefined process, and manual steps a user takes to create a correlation. As a user works with an application, the content of the work is analyzed by the system and the active elements are stored in the data catalog. In one example, data is elevated dynamically to the presentation surface of the UI for presentation based on who the user is, the point in a workflow (or task), the other source documents or applications that are open, etc. The means by which new correlation is generated need not be static. For example, a worker can attach a document to a process step, where the document is a new type. The user highlights important information in the document, setting hierarchy, metadata, labels, access permissions for other users, and so on. Attaching the documents to a process step automatically correlates the document type to the process step, and everyone who can see the step sees the information.

In one exemplary implementation of data elevation in business processes, a visual process map can be generated that graphically represents the dimensions, attributes and relationships of business processes and their supporting documentation. The map visually describes hierarchies, points, boundaries and divisions, nested layers, and work flow. Workers can consult the map to see all work in a broader context. Data elevation organizes and surfaces the most important data elements when, how, and where the user needs the data to make a decision or take action in the workflow. No longer is data scattered in disparate locations simply due to being created in a single application; a single interface displays all data elements necessary correlated to a task.

Figure 2:
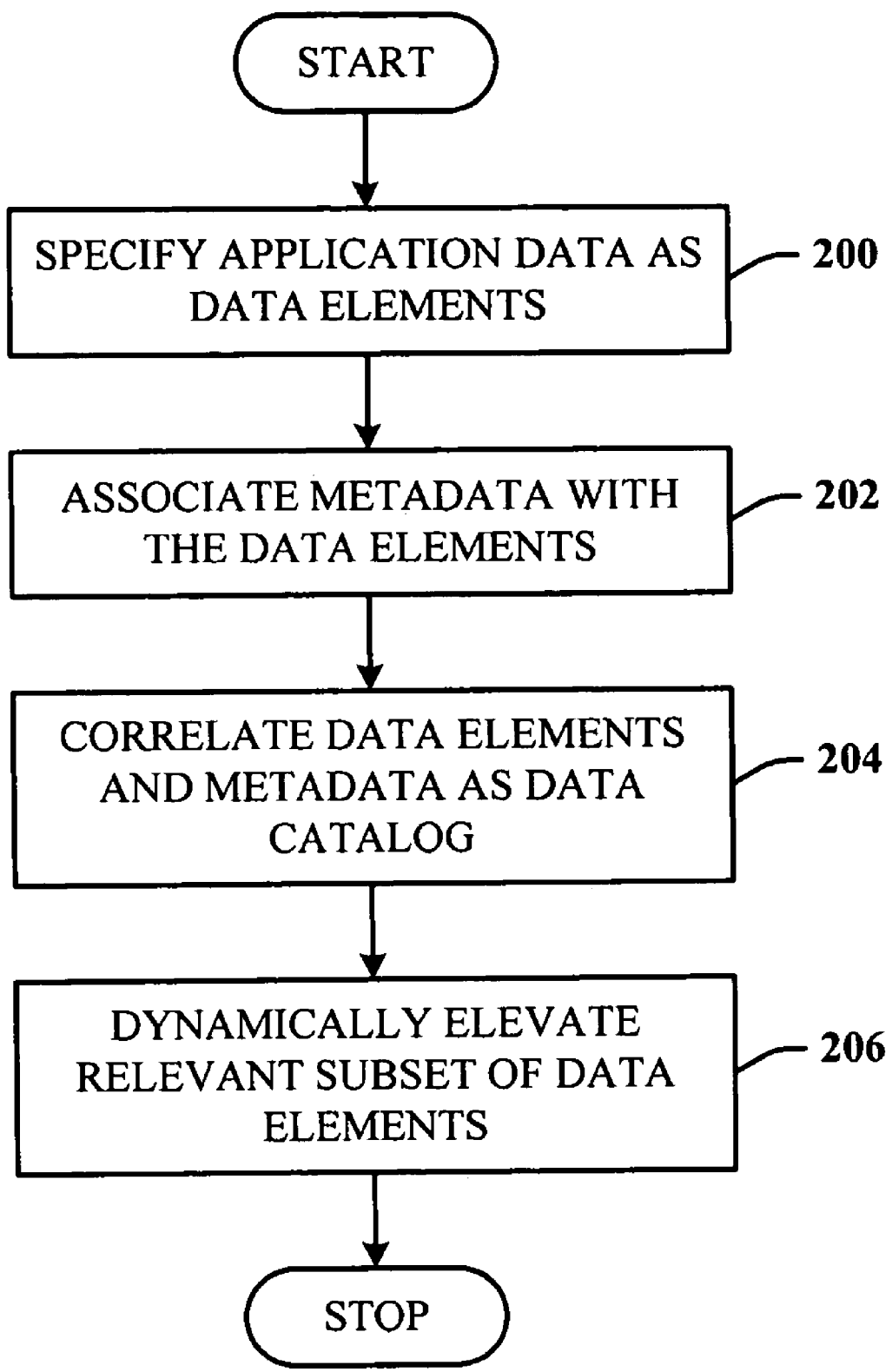
FIG. 2 illustrates a methodology of surfacing relevant data by data elevation.

FIG. 2 illustrates a methodology of surfacing relevant data by data elevation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, application data (or document) is specified as data elements. At 202, metadata is attached to the data elements, the metadata associated with user activity. At 204, the data elements and metadata are correlated for storage as a data catalog of data element relationships and attributes. At 206, a relevant subset of the data elements is dynamically elevated as data relevant based on the user (or application) activity. Data elements can be correlated and made specific for each user.

In other words, data and metadata (information about the data) are correlated in a data catalog based on and related to workflow, a user, usage of data sources by a user and/or system including documents, text entry, file properties, content scraped from application screens, URL content, email, instant messaging, and so on. Data is stored as the user works with source applications. Then data is elevated to the presentation surface of the UI when data that is correlated to the active work is discovered. Additionally, the type of device the user is using can affect what data displays and the manner of its display in the UI.

Figure 3:
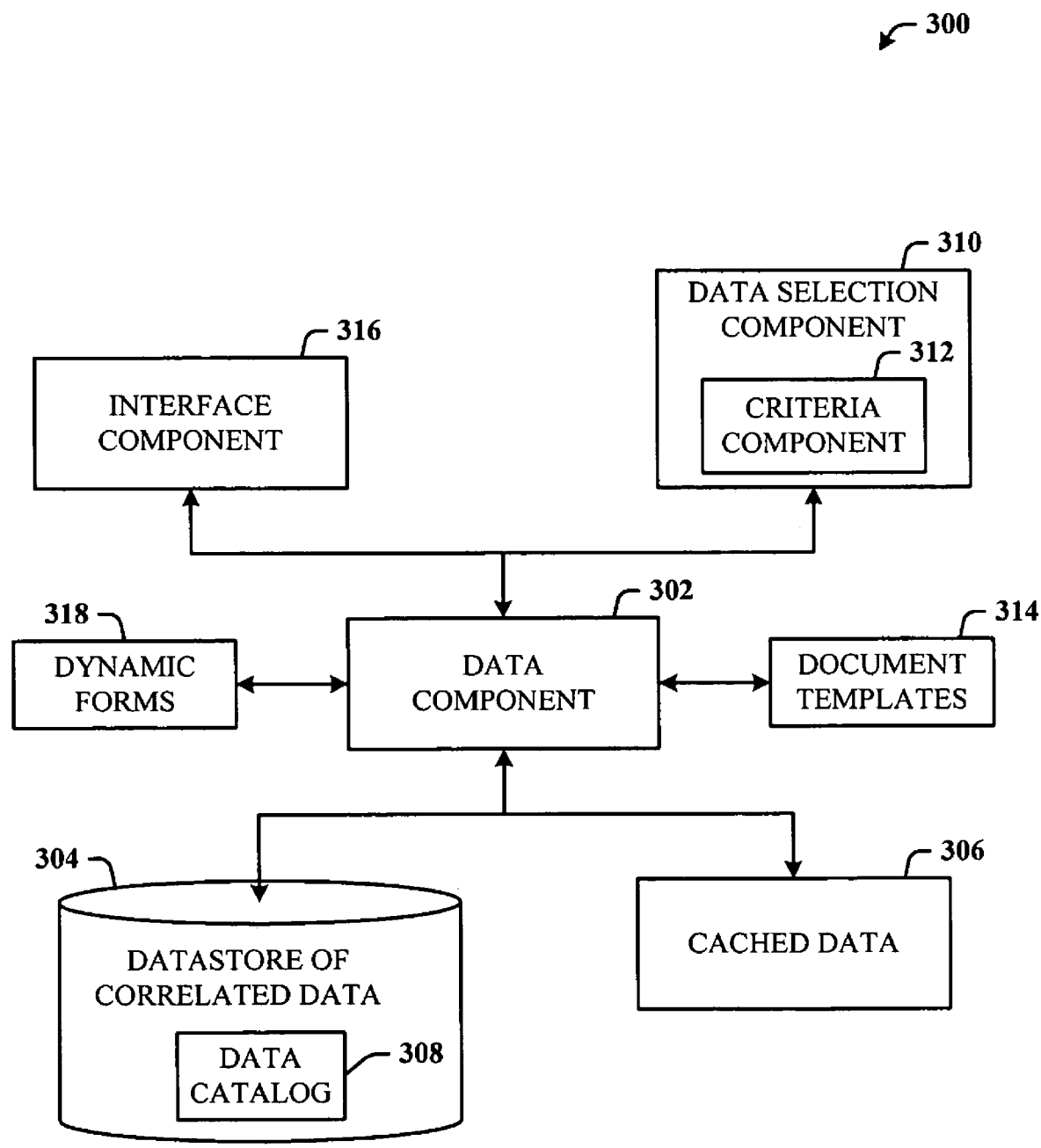
FIG. 3 illustrates a more detailed system that facilitates data handling in accordance with the dynamic data elevation architecture.

Referring now to FIG. 3, there is illustrated a more detailed system 300 that facilitates data handling in accordance with the dynamic data elevation architecture. The system 300 includes a data component 302 that interfaces to process data from at least two types of data storage components: a persisted datastore 304 and a data cache 306. Typically, a data catalog 308 can be persisted in the datastore 304. However, if for some reason the datastore 304 is unavailable, data can be pulled and elevated from the data cache 306.

The data component 302 processes selection information received from a data selection component 310, which provides the selection information based on criteria developed and received from a criteria component 312. Criteria, generally, is related to related words or keywords, formal relationships between forms. For example, if the user has opened an application, this activity is monitored and developed as criteria data that is sent to the selection component 310.

The criteria component 312 processes criteria as a basis for selecting the subset of correlated data. The criteria component 312 can also examine display (and other processing) capabilities of a device, and the data selection component 310 selects the subset of correlated data from the data catalog(s) based on the device capabilities. The data selection component 310 can dynamically select and deliver to the UI surface relevant data from all the related data based on correlation tagging where there is a connection to data that is already active on the display and prepares for or presents the related data to the user.

Document templates component 314 facilitates creation of data catalogs for many different types of documents and catalog configurations. Document templates 314 define the structure of the data elements of a document. Templates can be designed for business applications, for example. Tools can be provided for the customization of default templates, as desired by the end user. Document templates 314 can be accessed by the data component 302 as a reference for document data elements. The data component 302 receives the selection component signals (related to the open application) and accesses the datastore 304 for the data catalog information relevant to the application. Data elements of the data catalog 308 are passed up to the data component 302 and to an interface component 316 for presentation to the user.

The relevant data and related data are presented using a dynamic forms component 318, the dynamic forms assembled and populated when requested to display data in the UI. Dynamic forms support the ability of the user to view data flexibly, in whatever manner enables the user to complete a task most efficiently. This departs from conventional paradigms where a relationship is set in the form. Dynamic forms capability delivers forms that meet the objectives of direct action, data promotion, interactive communication with peers and partners, rich tools, customizations, interactive reporting and visualization in a data driven environment. Forms are delivered that are editable and adaptable at design time as well as at runtime. The forms are context sensitive to the current user, and have built-in layout intelligence that adheres to standard rules of content formatting and re-flows based on content type and form dimensions. Additionally, the forms can be customized and personalized by the user at runtime. The user can view data from a single document or multiple documents simultaneously. The user can also globally set the level of data to be displayed for all documents, or the user can set the level for a document independent of the levels of other documents.

Although illustrated as separate entities, the document templates component 314 and dynamic forms component 318 can be included in the data selection component 302 or the datastore 304, for example. It should be understood that the components (302, 304, 310,312, 314, 316 and 318) can be combined in any manner suitable for the achieving the desired data selection and elevation results.

With respect to data sources, data that is available for elevation in a document can depend upon the document type. As previously indicated, data sources can include structured and unstructured documents, databases, and metadata, which can be part of the datastore 304 and/or the data cache 306. Process properties can also be elevated for surfacing to the UI via the interface component 316.

Data elevation is supported by at least three components: the data catalog 308, document templates 314, and data sources (304 and/or 306). As indicated supra, the data catalog 308 is a multidimensional cube that supports data elevation. Data is stored and cataloged so that it can be quickly located at the confluence of multiple dimensions (e.g., source content, user role, process, document, usage role, . . . ). The data catalog 308 is continually refined and updated so that it reflects current correlations based on worker usage and content. The catalog 308 stores and tracks data based on several indicators, for example, whether data comes from multiple sources (e.g., text, document, application file, URL, business object, etc.), whether structured or unstructured, from a database or a system file as the source, or content scraped from application screens. Note also that data available for elevation from a source can depend on the type of the source.

The data catalog 308 is created in accordance with a data schema and defines how the data is stored. The data catalog 308 contains content relating to the schema and internal processes, as well as the external content that constitutes the documentation and information required by processes (e.g., business) of a company. (Note that throughout this description, the architecture may be described in the context of business processes. However, this is only one implementation, and is not to be construed as limiting in any way.)

The data catalog 308 can be extended or new catalogs created to meet the specific needs of different industries and customers. Thus, custom data catalogs can be an asset to an independent software provider (ISV), for example, which can then can be sold. After installation (e.g., at a customer site), the data catalog grows and evolves over time through use, thereby providing a flexible and responsive mechanism that learns from the worker choices making the process worker's job easier.

As indicated above, the data catalog 308 supports data elevation. The data catalog drives the semantics of data behavior, what is seen, where, when, and by whom, in the UI; more specifically, who (the user roles and permissions), what (data from one of more related or dependent documents), where (the process (or step) to be accomplished), when (the status of the process or child/parent process (time element)), how (layout of data on the form), and how much (levels of content based on context, user role, data importance, and relationship to other data elements; the user controls how much they want to see).

Storage requirements for the data catalog 308 mean the datastore 304 can support the following: data hierarchy, ranking for layout (values of high, medium, low), ranking per role and document/process; form layout rules (container relationship (including nested containers) and positioning of data on the form; relevance (multidimensional correlation of related documents and data); role access (view rights and update rights); versioning and audit trail of user change of elevated data; personalization (user-specific layer on top of basic settings); and, source of the data (integrated transactional database, file (document type), and URL). The database is able to correlate a data element across multiple documents, and multiple documents and processes can reference the same data element.

Data elevation organizes and brings to the surface the most important data elements when, how, and where the user needs the data to make a decision or take action. Filtered for the user, data elevation brings data to the level of detail and appropriate point in a workflow, for example. The amount of data surfaced can vary from task to task. In that computing systems are considered multi-tasking, as well as many experienced information workers, the data elevation architecture can elevate data concurrently among the various tasks that may be in-process.

Figure 4:
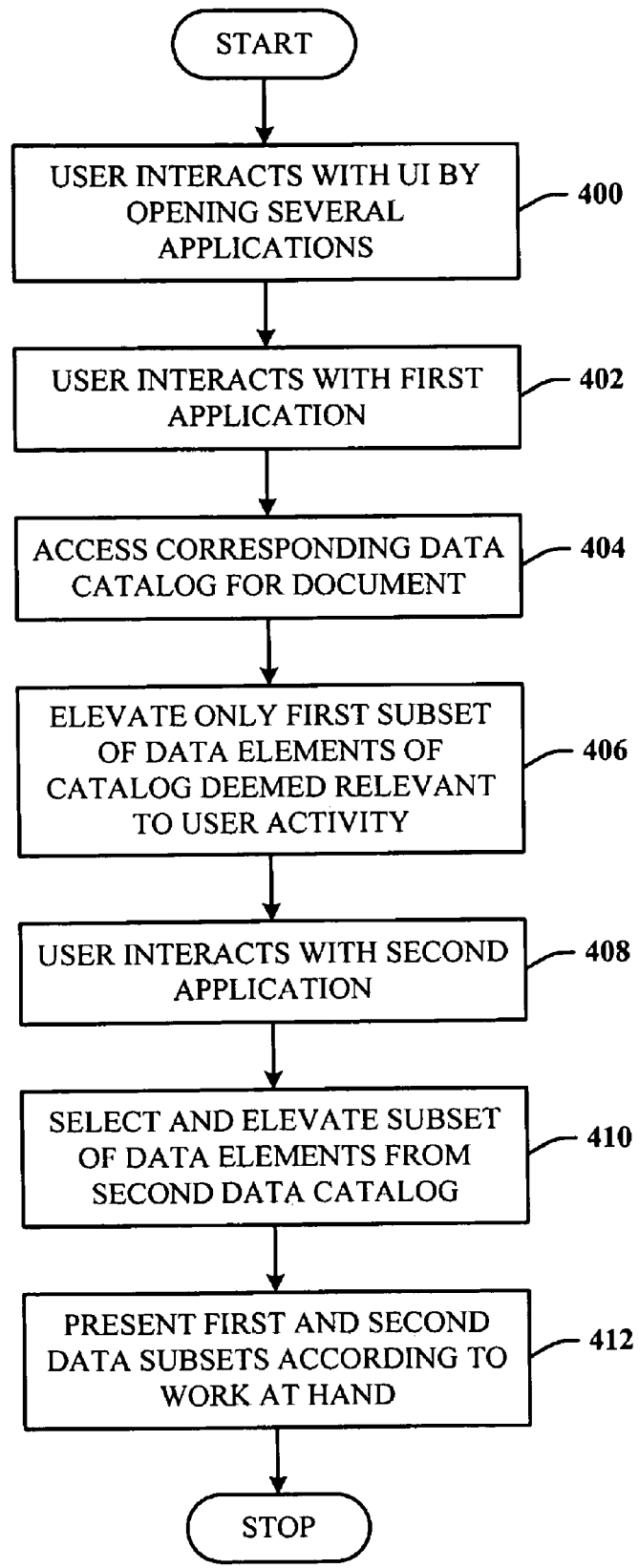
FIG. 4 illustrates a methodology of multi-tasking data elevation in accordance with the disclosed architecture.

FIG. 4 illustrates a methodology of multi-tasking data elevation in accordance with the disclosed architecture. At 400, the user interacts with the UI by opening several applications. At 402, the user interacts with the applications for data manipulation. This can include opening a document and/or creating a new document, for example. At 404, the system accesses the corresponding data catalog for an existing document in response to the user interaction. At 406, the system only elevates those data elements from the data catalog that are deemed relevant to the current user activity. In other words, the system elevates a subset of the first data catalog to the UI. At 408, the user interacts with second application. At 410, the system selects and elevates a second data subset from a corresponding data catalog based on the user activity. At 412, the system presents the first and second data subsets as deemed necessary to the work at hand.

For example, if the user is working in the first application, it may not be necessary to present the second data subset. Thus, the system selectively displays the elevated data according to criteria, such as the context in which the user is working. This also means that if the user now switches attention or activity to the second application, the first subset of data elements can be suppressed from the UI to provide a more uncomplicated or cluttered work surface. This control can be based on timing information, for example, where if the user does not interact with the presentation surface (and hence, applications or documents) within a predetermined period of time, the data will be suppressed (via faded or transparent graphics) from the work surface to present a more uncluttered effect to the user.

As a background process, the system can automatically fetch into cache the relevant data anticipated to be requested based on past user experience. For example, if the system learns that the user has consistently in the past started with a certain set of data, the system can elevate this data from the respective data catalog, and present it, along with fetching this data into the data cache.

Caching operations can also be based on the current device capabilities. For example, if the user is currently employing a device with limited cache memory capability, the system can be more selective about which of the data elements to elevate to the UI surface and cache for presentation and user activity.

Data elevation can use both structured and unstructured data, which either or both can stored in the data catalog. Structured data can be metadata and/or come from a database. Unstructured data is information identified by a worker as important, and which is caused to become part of the data catalog. Over time, the system learns from worker usage, choosing and adjusting data for viewing. Based on choices, the data catalog can be updated to continually reflect current user needs.

Figure 5:
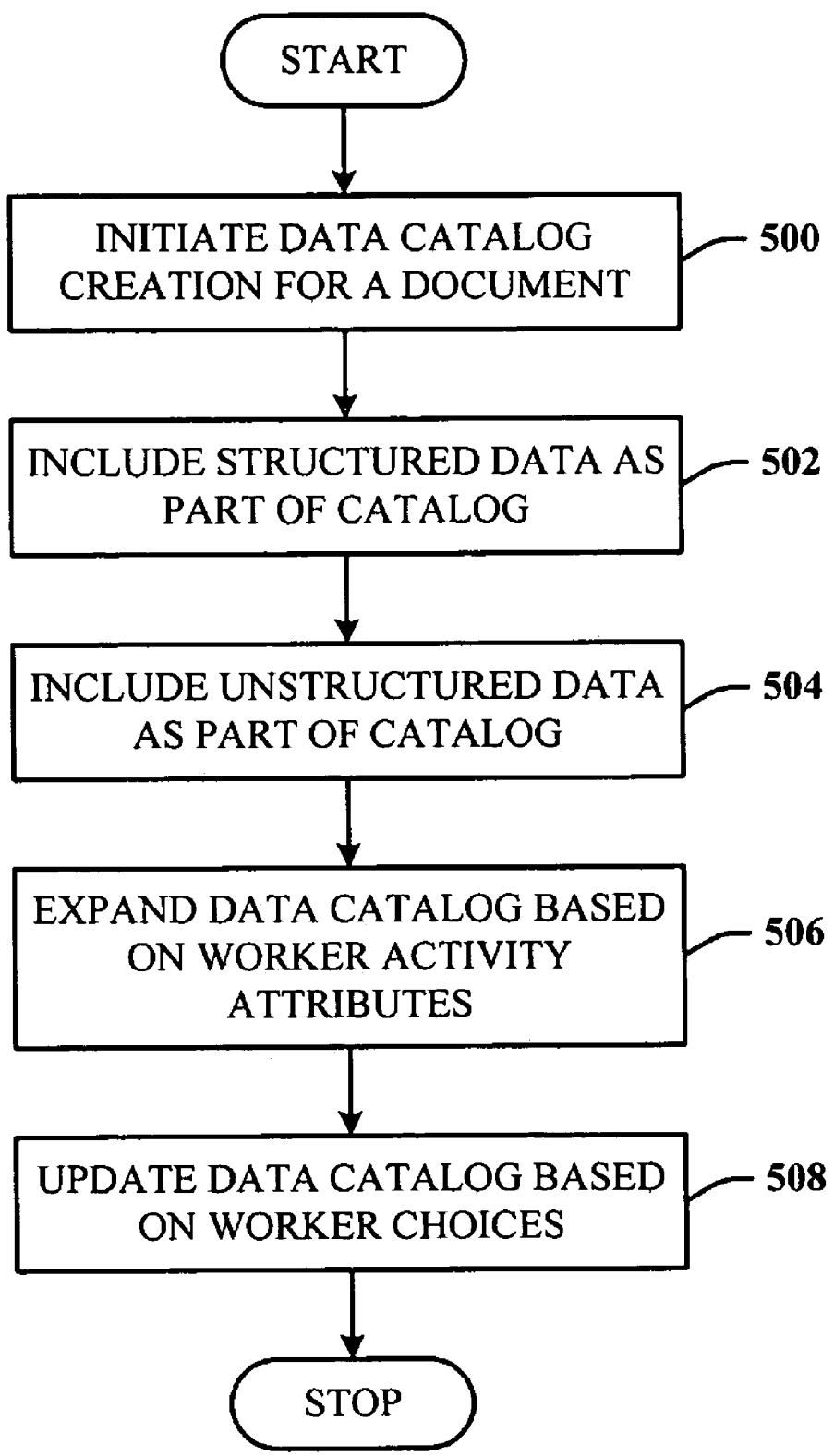
FIG. 5 illustrates a methodology of employing structured and unstructured data for elevation.

FIG. 5 illustrates a methodology of employing structured and unstructured data for elevation. At 500, initiate creation of a data catalog for a document. At 502, include structured data in the data catalog. At 504, unstructured data is entered into the data catalog based on user operations. At 506, the data catalog is expanded based on one or more of worker usage, the worker identity, device platform and capabilities, and so on. At 508, the data catalog is updated for this document based on worker choices.

Data elevation is characterized by the following features. Multidimensionality refers to the display of data in the context of the task or process, the document, and the role of the user, for example. Time, device or platform, and the personalization layer also express dimensions of the data.

Relevance refers to displaying only relevant data from core documents (documents required by the task) based on configuration of the document data. Related documents and corresponding relevant data (or core document) are listed based on mapping of data elements between a related document and a core document. Relevant information can also be correlated.

Data is elevated for core documents and related documents (in other words, for relevant data and related data). Core documents can include documents from an integrated application, a file from a file system, and/or even a URL link to web content. Related documents and their respective relevant data are listed based on data elements mapped between the related document and core document. The mapping may occur at design time by a modeler, or the worker can define it a runtime. The user can map fields, indicating the relationship, while viewing data across multiple documents. Selection of an icon, for example, can cause key data elements of a document to be dynamically elevated to surface in the UI. While viewing data that has been elevated, the user still has the ability to select (e.g., right-click) and open the document in its native application.

Figure 6:
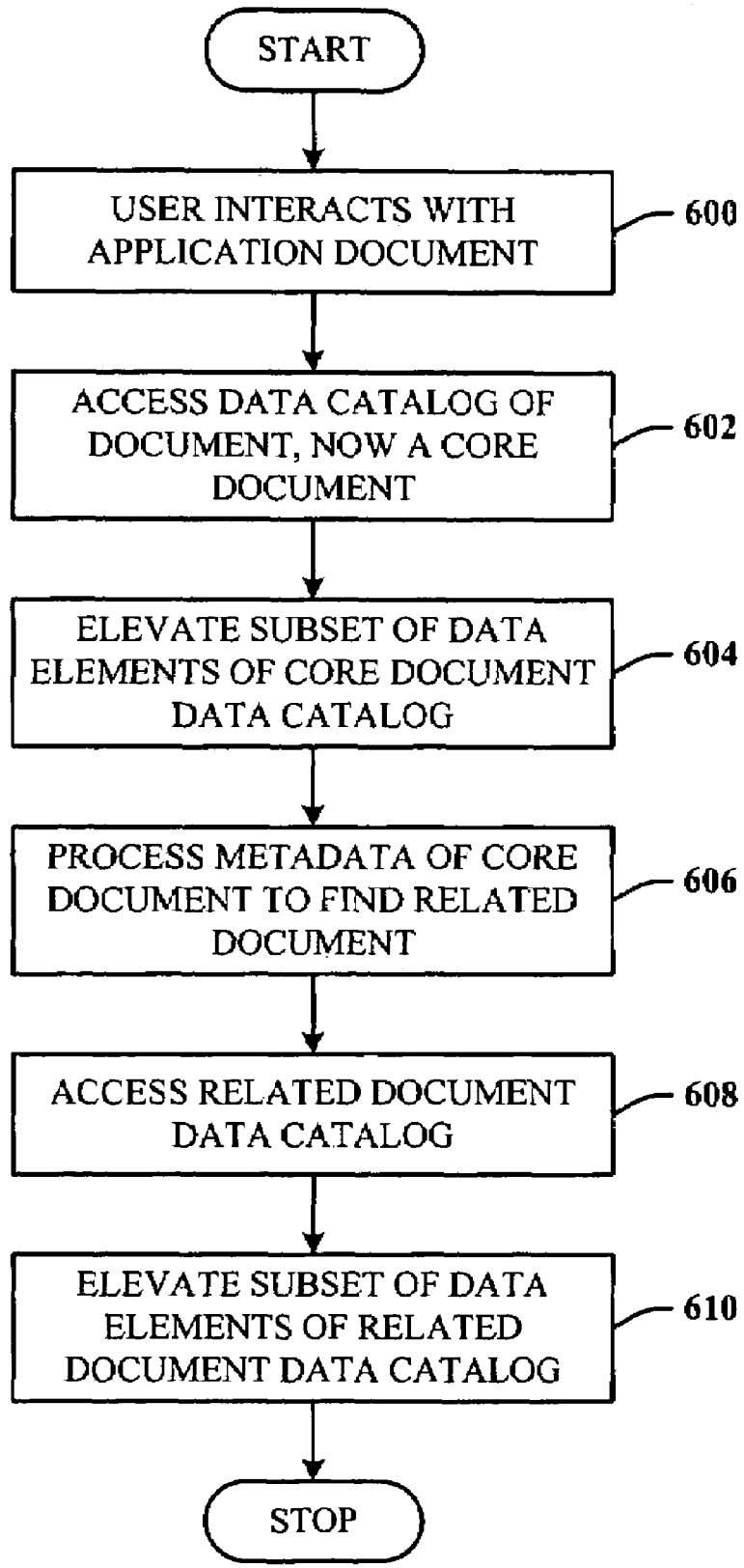
FIG. 6 illustrates a methodology of elevating core and related document data as part of data elevation.

FIG. 6 illustrates a methodology of elevating core and related document data as part of data elevation. At 600, the user interacts with an application document. At 602, based on user activity associated with the document, now considered a core document, the system accesses the associated data catalog. At 604, one or more of the data elements of the core document data catalog are elevated to the presentation surface. At 606, the system processes metadata (e.g., relationship information) of the core data catalog and selects a related document catalog. At 608, the system accesses the related document data catalog. At 610, one or more data elements of the related data catalog are elevated to the work surface in anticipation of or for presentation to the user. Note that a core document in one context can be a related document in another context, and vice versa.

Other features (or capabilities) of the data elevation architecture will now be described. A hierarchy feature refers to rich-context ranking that enables the user to display layers of data from the core and/or related documents, as needed, according to a level of importance associated with a task. Task properties can be assigned rank, as well as content.

A function feature refers to the ability of the user to view and/or edit data based on user permissions in the context of the task, and its core and related documents. The type and extent of data that appears can depend on user permissions. A user can add or edit data in the current context without having to navigate to the artifact. For example, a user might need to edit a Purchase Order Confirmation in a business application, or a defined form such as a Product Release Form. Edited data updates the original artifact. For transactional documents, this results in the update of the application's database. In addition to organization and positioning for elements on a form, a forms engine also knows what type of control to render the element in, the state of the control, and any validation rules to apply to the control.

This can be supplied by the following exemplary data element form-related attributes for function and state. Function is the type of data, how it will be used and whether it is required, and proper validation, if applicable. A string is displayed in a text box. A date is displayed in text box with calendar control. E-mail is displayed in a text box with e-mail lookup. Fax and phone data is displayed in text box. Currency is displayed in text box with calculator control. A list is displayed in drop-down list box. Images are displayed one or more images. A column is displayed as one or more elements or containers. A table is displayed as one or more elements in a table structure. A radio button is processed as a set of options that are mutually exclusive. Check boxes and state information (e.g., read-only) can also be provided.

Hierarchical levels determine the layer in which data content displays. In one implementation, the most important and smallest amount of information necessary is the first level of importance in the hierarchy. The user has the ability to change this ranking (location in the hierarchy) of any data elements and to display more levels as needed. Rich-context ranking enables the user to view layers of data from the core and related documents as needed, according to their level of importance to the task. The most important and least amount of information necessary can be presented via the first layer that surfaces. The user can choose to expose more layers as needed. In place of configuration ranking at design time, a modeler can opt to have the system determine data rankings dynamically based at runtime on user choices.

Figure 7:
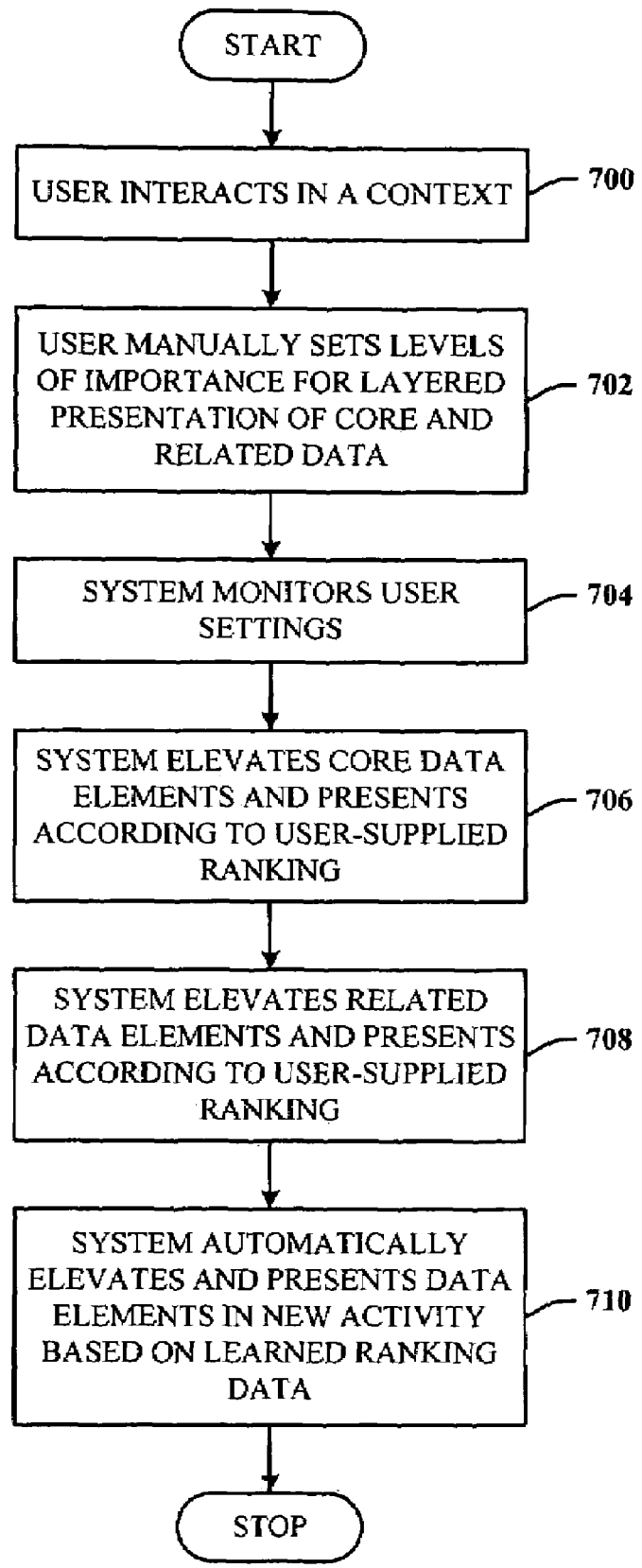
FIG. 7 illustrates a methodology of hierarchy processing of elevated data.

FIG. 7 illustrates a methodology of hierarchy processing of elevated data. At 700, the user interacts in a context (e.g., an application). At 702, the user manually sets levels for importance to layered presentation of core and related data. At 704, the system monitors user ranking for subsequent automatic ranking. At 706, the system elevates core data elements and presents the data elements according to the user-supplied ranking. At 708, the system elevates related data elements and presents the data elements according to the user-supplied ranking. At 710, the system applies learned ranking data to automatically elevate and present core and/or related data elements according to learned data.

Data can be organized based on the hierarchical relationship between the data elements derived from one or multiple sources, and from data that is specified in the data catalog. A goal of defining this hierarchy is to provide a set of constraints that will allow for the accurate and appropriate display of elements in the proper context. The hierarchy includes a form level, container level, and element level. The form level is the highest-level container and can contain a simple set of data elements, or subcontainers, that group data by an existing relationship. For example, a hover summary can provide some key data elements concerning a selected object. A more complex example is a step detail or a purchase order.

Container levels are a group of data elements within a form. A container can additionally be broken down into types, such as a table for the line items versus multiple columns for shipping information. A parent container defines rules and properties for child containers. Containers can be nested and adhere to parent container boundaries. Containers support n number of nesting at container levels. An element level is an individual data element that is associated with a container. Element properties can override properties inherited from the parent.

To support the ability to organize data on a form, the system supports a set of attributes that can attach to data to instruct the form on the container association, data element position within the container, as well as data element dependencies.

Relevance refers to levels of a relationship between one data source to another, which can occur through an explicit act by the user or implicitly through the system's tracking of the worker's usage. Relevance is the level of importance that is attributed to the data elements. Depending on the current context, users may want to see high relevance data, a combination of high and medium relevance data, or any combination that makes sense to the user at the time. The relevance level can be defined and modified by any of the users of the system, and pushed down through the rank of modeler, manager and worker, with the end user having the ability to personalize the data they most care about. As indicated supra, data is elevated to the UI based on its relevance to the source that is in focus.

Containment defines where in the hierarchical structure of the form the data will be displayed. Containment can be determined by a static property or can be driven by factors of the current context.

Positioning determines the order of data placement within a container by a forms rendering engine. For example, in a billing information container, a company name would have a position of 1, the contact name would have a position of 2, and so on. Positioning does not indicate placement on the form, only the order that it appears. A layout component of the form rendering engine can be used to determine where to put it.

The ability to provide context of a data element within a form is supported with data element form-related attributes, such as membership, origin, dependency, function, state. With respect to membership, some data elements, if displayed on a form, can require additional elements to provide enough context for them to make sense to the user. Membership can be set so that when an element is elevated into a form, the other member elements are elevated as well. For example, if Quantity is bubbled up on an item, then item# should be bubbled as well; establishing memberships between these two elements will achieve this. Origin indicates the source of the data element. Dependency can be described between elements from the same source or elements across multiple sources.

The ability for the form to determine placement of elements is extended to containers as well. For example, as the form is a scaled horizontally, two 1-column containers, stacked vertically, can be repositioned to side-by-side placement.

The flow of information display adheres to a set of layout rules, including grouping and free form. A part of data presentation is to deliver forms that understand principles of layout, and that can organize and present data to the user in a manner that reflects hierarchy, relevance, and function. Up to now, the burden of making these decisions has been placed on the forms designer. This designer model works well for designing forms that do not change or change infrequently.

However, in an environment where data is in constant flux based on changes in company policies and in the current business situation such as a partial confirmation exception, for example, it is a formidable task for designers to continue to redesign a form to meet data requirements as the requirements change in realtime. Likewise, it is equally difficult to expect that each form be designed for all possible changes to data as well as changes to what is relevant to the user. Instead, the disclosed architecture provides the logic for presenting data in a form that adheres to a set of layout rules, a hierarchical relationship of elements, and is sensitive to the screen constraints of where the data is displayed.

A set of layout rules is provided that adheres to standard design concepts for flowing data, while also maximizing the viewing experience and efficiency for the user. Examples of standard design concepts include mapping to a 2-column grid or auto correction for orphaned or widowed elements in a column of text or data. In addition, sensitivity to screen constraints is provided. A grouping of images that illustrate the design of a widget can be displayed to the user.

With respect to form adaptation to resizing, the parent container itself contains maximum and minimum columns, and minimum and maximum height of the form. When the form is physically narrowed, a table section, for example, drops below certain information, keeping all information visible, and preventing horizontal scrolling. Controls can also be set to grow with the use of the form. As the width increases, the text boxes increase in width as well.

An adaptable image container can be configured to display multiple images from a single source or multiple sources. The container can also be configured to display these images all at once or adapt to the size of the container on the form. As appropriate, the user can be given a paging mechanism for viewing images. As the container is resized, images are hid or revealed. The container is also smart to respond to horizontal and vertical resizing.

Based on both the use of dynamic forms and an interface that enables flexible viewing of data and editing of elevated data, flexible display of elevated data includes changing the size of the viewing area to see more or less data, merging data from multiple sources, and viewing data from multiple sources in parallel for comparison. Flexible viewing is enabled by data elevation, such that the user can view the data flexibly in whatever format desired. This helps the user to complete the task most efficiently. Dynamic forms, as mentioned above, support the capability of merging data from multiple documents, expanding the size of the viewing area to seem more data, and to view data from multiple documents in parallel, for comparison, for example.

The capability is provided to customize how data displays per user, group, system, or device preference. Personalization is enabled by data elevation where customization by a forms modeler can be performed, as well as dynamic personalization by the end user. The end user can remove data elements from a form, change the hierarchy and order of the data elements, and add metadata at runtime. A user can personalize the view of the data that they see in a task at runtime. The user can add, edit, and remove metadata, edit or remove data elements, change the order in which data elements appear within a level, or move a data element to a different importance level. Customization for an individual view or as a published view is also supported.

If the user chooses to change the importance level of data at runtime, she can choose to apply the change to a process template, for example, so that it shows up in the next instance of that process. The user can move or combine data elements from multiple documents by dragging a related document onto the selected document in a viewing pane. The user has the option to "lock" the data for all occurrences. This gives the user the ability to sequence data elements by document to meet the desired needs. The explicit action of dragging an element and dropping it on top of another can establish a new relationship, create an additional relationship, or break an existing relationship without writing rules or code by the user.

The user can choose to share a unique view of data with other users using the share folder. The user can discuss a document with a coworker or a customer, or perhaps delegate work to a coworker by using this share capability. In the first scenario, the user wants to discuss a document with a coworker, but both have personalized the document to their own way of working. To make sure that they are "on the same page", the user drops the personalized document into a shared folder. The user had generically preconfigured this folder for sharing views of her documents (in terms of viewing or blocking all or selected data items, whether the other user may change exposure of levels of data, and so on). When the document is dropped into the shared folder, the user can edit the configuration to select the coworker, select to block some data elements, and lock the levels of importance. The configuration for this document only can be saved.

In a different example, the user delegates a process to another coworker because the user will be out of the office when the process becomes due. The user drops the document in a shared folder, which is generically preconfigured for sharing data in documents with others (e.g., permission to adds, edit, or remove data elements, and so on). When dropped into the shared folder, the user selects the coworker to whom the process has been delegated, reviews the configuration, and decides to change nothing. The user can then save the configuration for this process and document only.

In support of data elevation, dynamic forms provide the ability of the user to view data flexibility, in whatever manner enable the user to complete the task most efficiently. This breaks with the traditional development approach of setting the relationship in the form. The user can choose to view data from a single document or from multiple documents simultaneously. The user can globally set the level of data to display for all documents, or the user can set the level for a document independent of the levels of other documents. Other forms features include: the ability to "undock" the viewing area to a separate expanded window especially important if large amounts of data or when viewing data from multiple documents; the ability to scroll through data for all selected documents together ("locked" or decouple and scroll the data for each document separately); and the ability to view related documents that contain that data element.

The importance level set by the user determines the amount of data that appears. Based on user permissions, data elements can be editable or view only. Where appropriate, the user can select from a list or calendar to enter data, in addition to manually entering information in a field box. For data elements that contain a value, the user can select it (e.g., right-click on) to edit the value. Data can be displayed flexibly. When the user resizes the form, the data flows to fit available display area. For line item rows (data elements linked in a row), which are common to many business forms, and which can be long, the line item data wraps to fit the smaller viewing area. Alternating background color can be employed to help distinguish between rows.

The user can also choose to view the data in a tile format or a merged format. In merged view, multiple documents selected by the user merge into a single view enabling the user to compare data from multiple documents. A different color can be used to distinguish data from each document. Hovering over a data element can be configured to display the name of the data element's source document.

Figure 8:
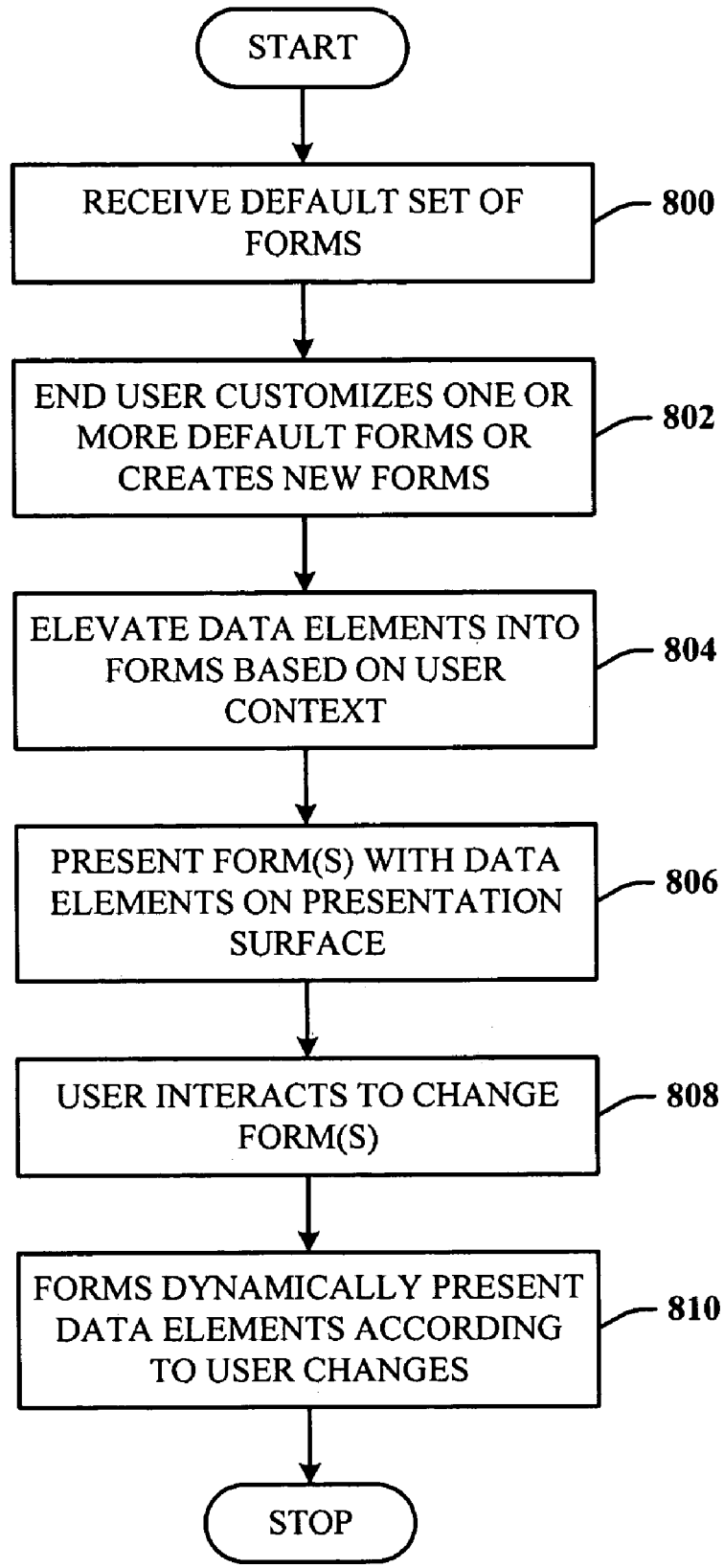
FIG. 8 illustrates a methodology of managing flexible viewing of data elements at the presentation surface.

FIG. 8 illustrates a methodology of managing flexible viewing of data elements at the presentation surface. At 800, a default set of forms is provided. At 802, the end user edits one or more of the default forms or creates new forms for use. At 804, date elevation occurs to elevate data elements into the default and/or customized forms. At 806, the forms are presented to the user with the elevated data (core and related documents). At 808, the user interacts with the forms to change the appearance, fields, enter new data, etc., for example. At 810, the forms are controlled to dynamically present the new data elements or the old data elements in the new format. Accordingly, data is elevated and presented to the user according to the task at hand. Moreover, the user can change the look of the dynamic forms, data elements presented, size of the form, layers, etc., all information of which is captured and stored in the data catalog of the corresponding documents (core and related).

A benefit of data elevation is the ability to display data exceptions to the user. This exposure enables the user to manage by exception, saving time and effort. Data elevation supports a user's need to manage by exception by detecting and highlighting invalid data when data exceptions or unexpected events occur. A data discrepancy can initiate an inquiry or entire series of additional steps. At design time, a modeler can create rules for elevating data and initiating a new step when an exception occurs. Alternatively, a user may dynamically link data at runtime and at the same time may define an exception rule for the linked data.

Two ways that data elevation detects and displays exceptions is through data mapping and the use of business rules. Exceptions appear as a faulty data when mapped values do not match between selected documents or the data fails when validated against a business rule. The ability to specify rules for elevating data when exceptions occur, including business rule exceptions, data relationship mapping, relationship exceptions, and ad hoc exceptions.

Data elevation can highlight the exception with a warning icon (e.g., red exclamation point in a caution yellow diamond). The user can select the icon to view a brief description of the cause of the exception. The exception can also be flagged with an icon as a warning to the user, enabling the user to choose when to deal with the exception (as opposed to an alert message that would require immediate action). When mapping or setting up business rules, the modeler can enter instructions that appear when the user right-clicks on the warning icon.

A sample business rule exception step follows. A business rule is setup in the where an exception occurs if the number of items on a truckload exceeds 20,000, which is the maximum for a full truck load. When this occurs, the appropriate data element is highlighted with a description of the problem and the process resolving it. The user can then make an adjustment to split the order between a full truck load and less-than-full truck load, for example. The carrier code is automatically updated for each line item on the sales order to eliminate redundant data entry. Compliance with the business rule and is then validated, and the user to completes the process.

Following is a sample data relationship mapping exception. A user selects several documents (core and related) to make sure the quantities, descriptions, and costs are the same. The user selects a merge view function in order to compare the line item rows side-by-side. The system flags any values that do not match, with a warning icon. The user can then select the icon to view the cause of the exception; however, the cause is apparent in this case. Based on the user's knowledge, the user can choose to edit the field, or possibly even choose to ignore it.

In terms of an ad hoc exception example, logistics learns that there is a change to a customer's shipment. The logistics employee learns from the customer account manager that the customer needs to change the ship-to destination for one of their shipments. The logistics employee contacts the warehouse to see if this is feasible. They tell her they will check and get right back to her. After checking, the warehouse contacts the logistics employee, confirming they can accommodate the change. The logistics employee revises the delivery documents, marks them Revised, and sends them to the warehouse. Upon receipt of the revised documents, the warehouse e-mails confirmation of the change to logistics. Logistics e-mails a revised Advance Ship Notice to the customer.

The following illustrate one set of exemplary steps for the handling of this exception. Upon receiving the customer's request, the account manager checks the map and sees that warehouse has not yet shipped the goods. He edits the sales order to reflect the change. The changed event is detected and the activity Shipping Change Order is initiated. Opening a Change request, the logistics employee reviews the sales order affected by the change. Data elevation has highlighted the changed data elements. The logistics employee clicks Send to transmit the change to the warehouse. This activates a Change Confirmation step for the warehouse. The warehouse completes the Change Confirmation step, indicating they can make the change. The logistics employee completes a Revise & Send delivery document step (sending the revised documents to the warehouse) and then sending a revised shipping number to the customer.

Figure 9:
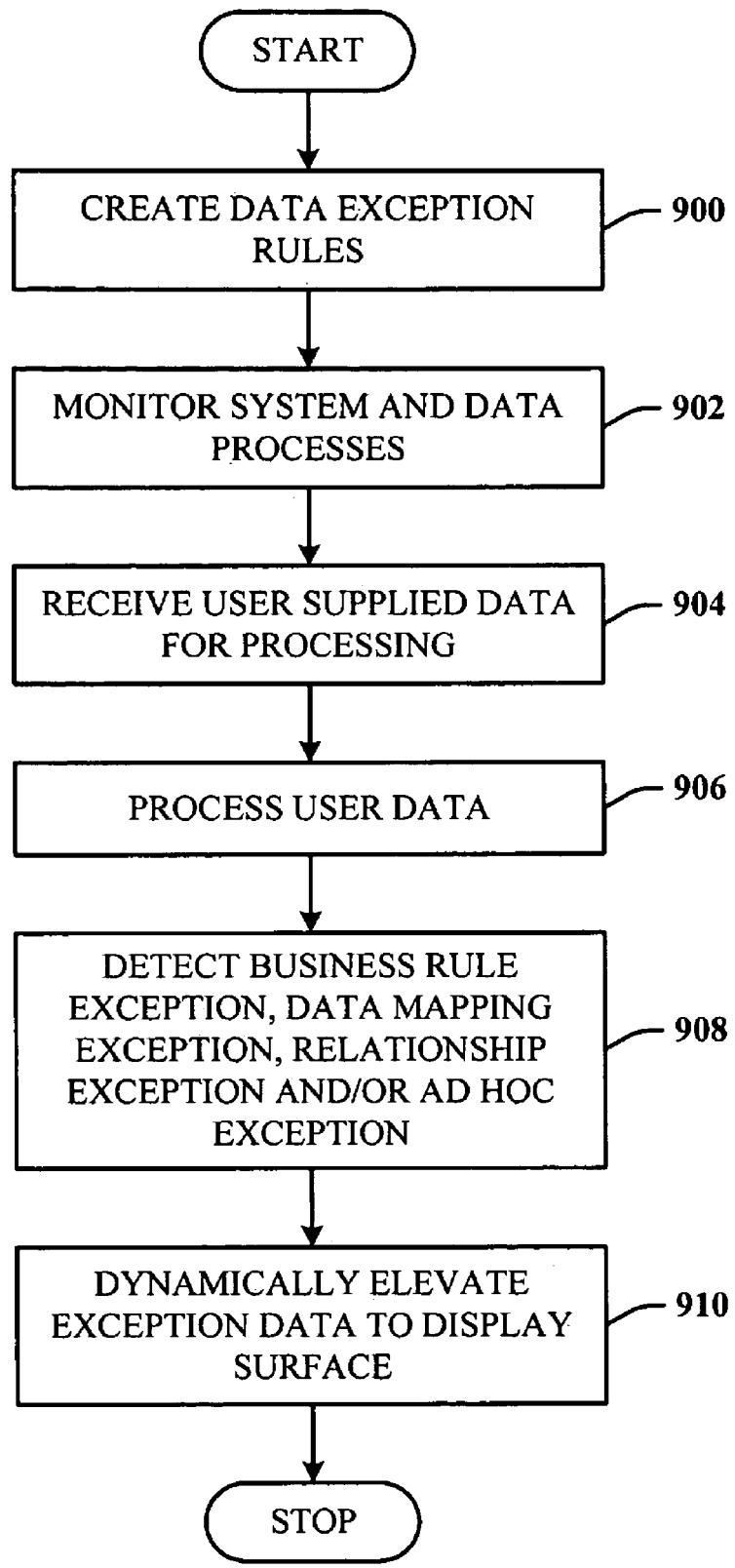
FIG. 9 illustrates a methodology of handling exceptions by data elevation.

FIG. 9 illustrates a methodology of handling exceptions by data elevation. At 900, data exception rules are created. At 902, system and data processes are monitored. At 904, user supplied data is received for processing. At 906, the user data is processed. At 908, one or more exceptions (e.g., business rule, data mapping, relationship, ad hoc) are detected. At 910, the exception(s) are elevated to the display surface.

Data elevation is media-agnostic, supporting the elevation of relevant data to any device, anywhere, anytime. The flexibility of viewing data may be constrained by size limits of the platform (for example, mobile devices such as PDAs, mobile phones). The prioritization of relevance applies to any display dimension. Based on both the configuration and the device, there is a controlled surfacing of the data. Relevant data can be displayed on any type of device, within the constraints of the device (e.g., desktop PC, large displays, and mobile devices such as laptop, tablet PC, PDA, cell phone) in content and format that is appropriate for the device.

Figure 10:
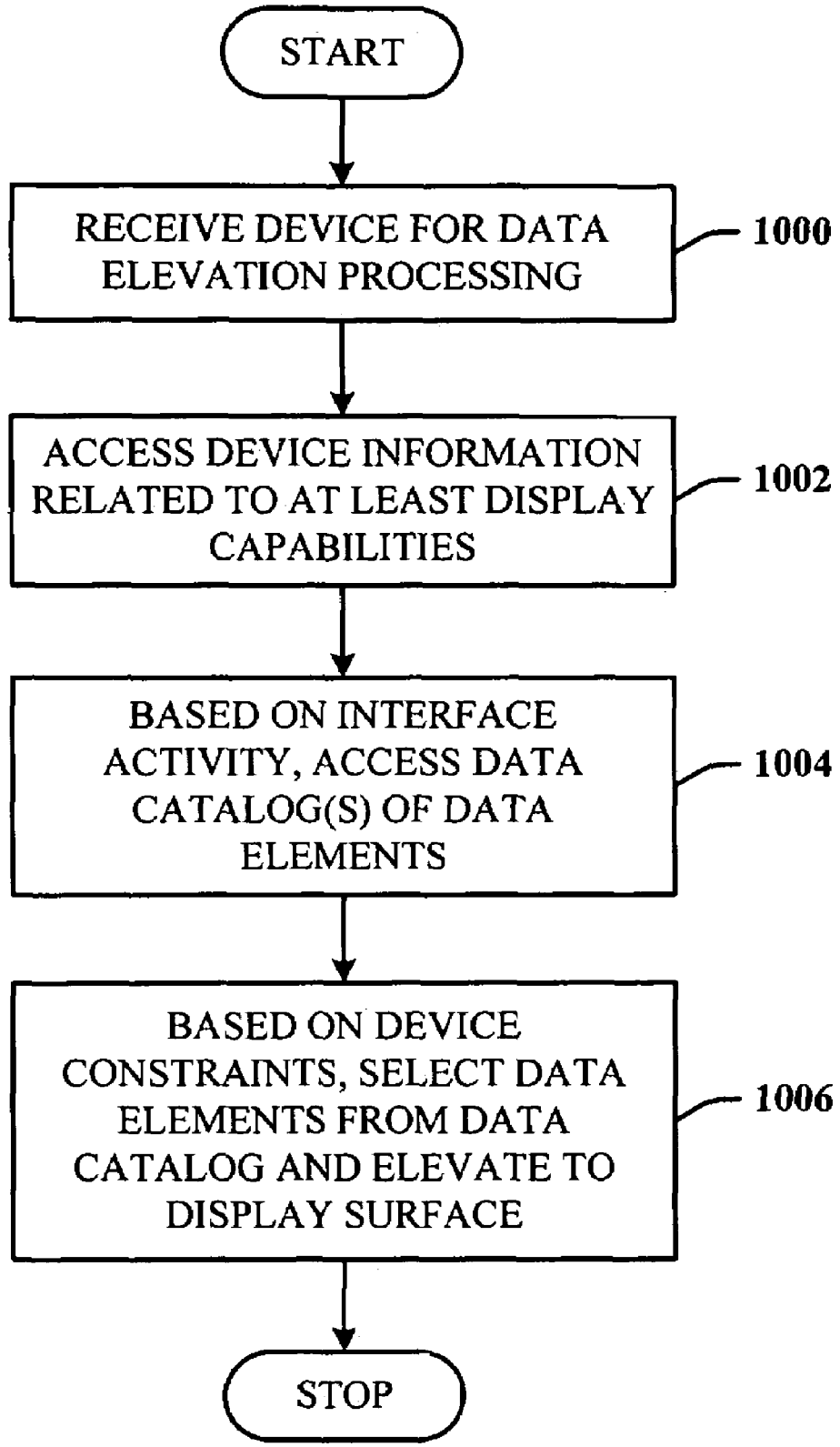
FIG. 10 illustrates a methodology for elevating data based on device parameters.

FIG. 10 illustrates a methodology for elevating data based on device parameters. At 1000, a device is received for processing user (and application) activity. At 1002, the system accesses device information related to display capabilities and processing capabilities, for example. At 1004, based on the activity, the system accesses a data catalog of data elements. At 1006, based on device constraints, data elements are selected from the data catalog and elevated to the display surface. This can also include selecting forms based on the device constraints.

History is the ability to maintain an audit trail that tracks versions of elevated data within the dimension of time by storing a record of who touches what data when. For the purposes of versioning and audit control, elevated data is tracked within the dimension of time, tracking who touches what data and when. The ability to edit data requires tracking accountability for those changes, especially for structures business documents. Consequently, data elevation provides a history or audit trail of all persons who have touched the data.

In one business-related customization example for building a data catalog, a methodology for gathering and cataloging data can include of the following steps (or processes): collecting detailed data from on-site research of a worker's experience; analyze the research in order to build a deep understanding of the information worker's experience; creating an experience model that describes the information that a worker might experience; creating a map of the tasks and the flow of data for each task, indicating data input and output; and, building a database that catalogs the data according to the data flow mapping.

The experience model ultimately identifies and links the components of the worker's world in terms of data: the entities that handle the data (the individuals, departments, companies, and software applications with whom the worker interacts); the containers of data documents and focus from database or file; and, the key data elements (the input and output for each task that describes the flow of data elements from sources to destinations (internal and external)). Identifying the source and destination of each task in terms of these components produces an outline of the data flow.

The experience model is the basis for creating a data map. This step involves first identifying the key activities and breaking each activity into its requisite tasks or steps, then identifying the documents and individual data elements for each task. The data map defines both the process and the data points to elevate for each process. It identifies the sources of data required for task completion (input), the destination of data and its format (output), and the key data elements for task completion in terms of each core and related document. The data map illustrates flow patterns at a very granular level of the data elements, and demonstrates the flow of the data from one context to another over time. The map identifies patterns in data element handling and flow and produces a framework for populating the data catalog. The data map also helps identify gaps in the collected information, which become goals for further research.

The data map provides the basis for the data catalog, which populates key data for each process (task or step). As previously indicated, the catalog contains the individual data elements and identifies the various contexts in which the data elements are used such as role, user, process, document, point in time, and device, for example.

Provided in the disclosed architecture is the ability to define the structure of data elements contained in a source in order to control which data appears and how it is displayed when a user opens a source. This includes the ability to customize existing templates as well as to define custom templates.

The look and feel of the focus can be modified by the user. This support can be as simple as providing a set of templates that a user can choose from, but should also include the ability to modify the full spectrum of elements of the appearance by specifying font type, size, weight an style, to border size, color and width, to paragraph and page formatting. The following is a sample list of style attributes that should be modifiable: fonts, controls, containers, background, horizontal rules, bullets/numbering, headings, body text, borders, images, and charts and graphs.

Default templates for transactional documents can be generated and provided for integrated line-of-business (LOB) applications. Each template can be provided preformatted and contains standard data elements of the business document. The modeler can adjust the template as needed, adding, removing, and rearranging the data elements on the form to meet the needs 6f the business. If the LOB application contains customization, ISVs can create custom templates for their vertical products that integrate with the LOB application.

For example, an administrator or VAR (valued added reseller) installs forms software for a customer. The system detects the installation of the forms software and makes the document templates available for use with the processes that the modeler defines. These transactional document templates, for example, can include purchase order, packing slips, pick ticket, sales order, credit memo, debit memo, and invoice. Because he is a VAR who has customized the sales order for his customer by adding custom fields, the modeler selects the sale order template to add the custom fields. A list of all available tables is displayed, from which the VAR selects the appropriate table. From the list of all fields, the VAR drags the custom data elements and drops them into the sales order template in the desired location.

For example, a worker attaches a document to a process step, where the document is a new type. The worker highlights important information in the document, setting hierarchy, metadata, labels, access permissions for other users, and so on. Attaching the documents to a process step automatically correlates the document type to the process step, and everyone who can see the step sees the information.

For file system documents, file properties are the lowest level of data elevated. In addition to file properties know to the system, the user can define data elements for structured or semi-structured documents. To do this, the user opens the document and manually highlights fields or ranges of text, assigning data elevation values to them, and then arranging those data elements.

While certain ways of displaying information to users are shown and described with respect to certain figures as screenshots, those skilled in the relevant art will recognize that various other alternatives can be employed. The terms "screen," "screenshot", "webpage," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

The following scenarios illustrate three different ways in which elevated data can flexibly display with the UI: in a workflow application, in a visionary unified workspace, and on multiple devices (e.g., cell phones to a current Windows desktop).

Following are descriptions and examples of the functions of data elevation in the context of supply chain activity (purchasing) and an architect's activity in an imaginary unified workspace.

Figure 11:
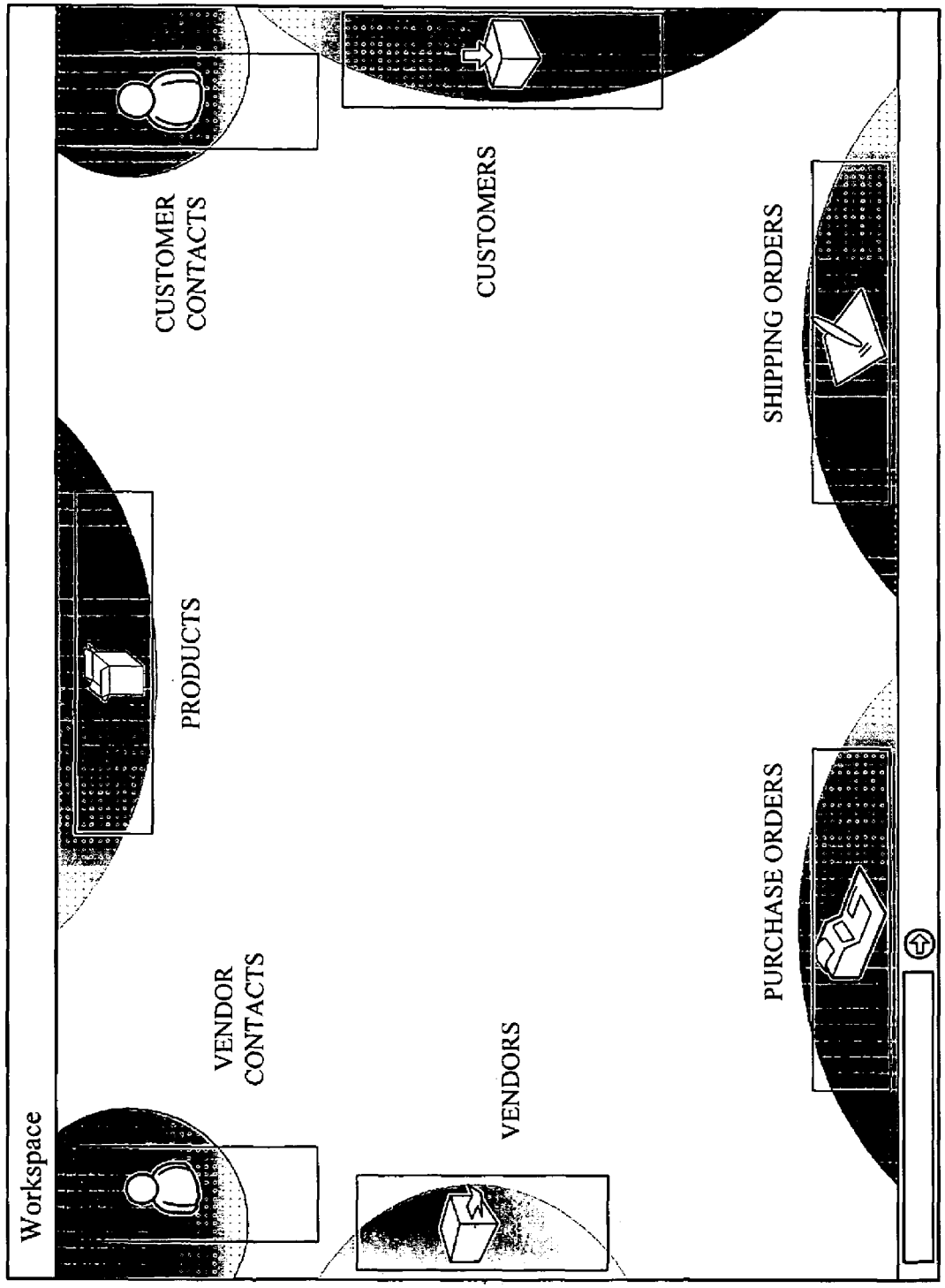
FIG. 11 illustrates a unified work surface having meaningful regions in business logic implementation of the workspace work surface.

FIG. 11 illustrates a unified work surface having meaningful regions in business logic implementation of the workspace work surface. Data can be dynamically elevated in association with these regions. Meaningful regions (or landmarks) are the design concept of defining/placing similar objects in a consistent location of the unified workspace as a way to aide the user in glancing for specific information. Here, the work surface includes seven regions: a vendor contracts region, a vendors region, a purchase orders region, a shipping orders region, a customers region, a customer contacts region, and a products region. In this implementation, the meaningful regions are positioned around the periphery of the work surface.

Figure 12:
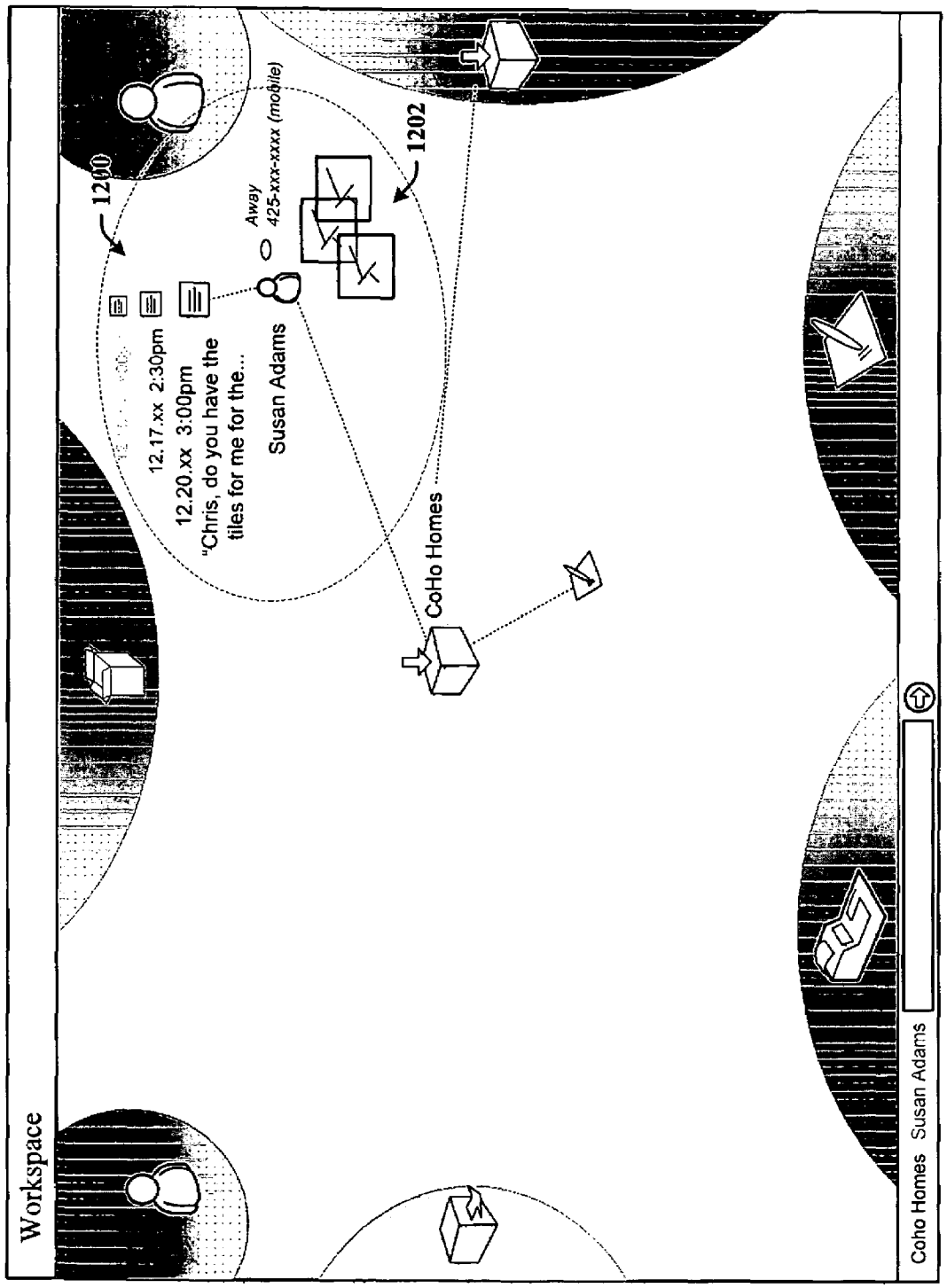
FIG. 12 is a screenshot that displays data from different data sources that are related.

FIG. 12 is a screenshot that displays data from different data sources that are related. In this case, a customer contact's e-mail communications 1200 between the user (Chris) and the customer contact (Susan) come from a different source than the customer and customer contact data. Below the Susan Adams icon appear related workspaces 1202 (past or current), which is yet a different source of content.

Figure 13:
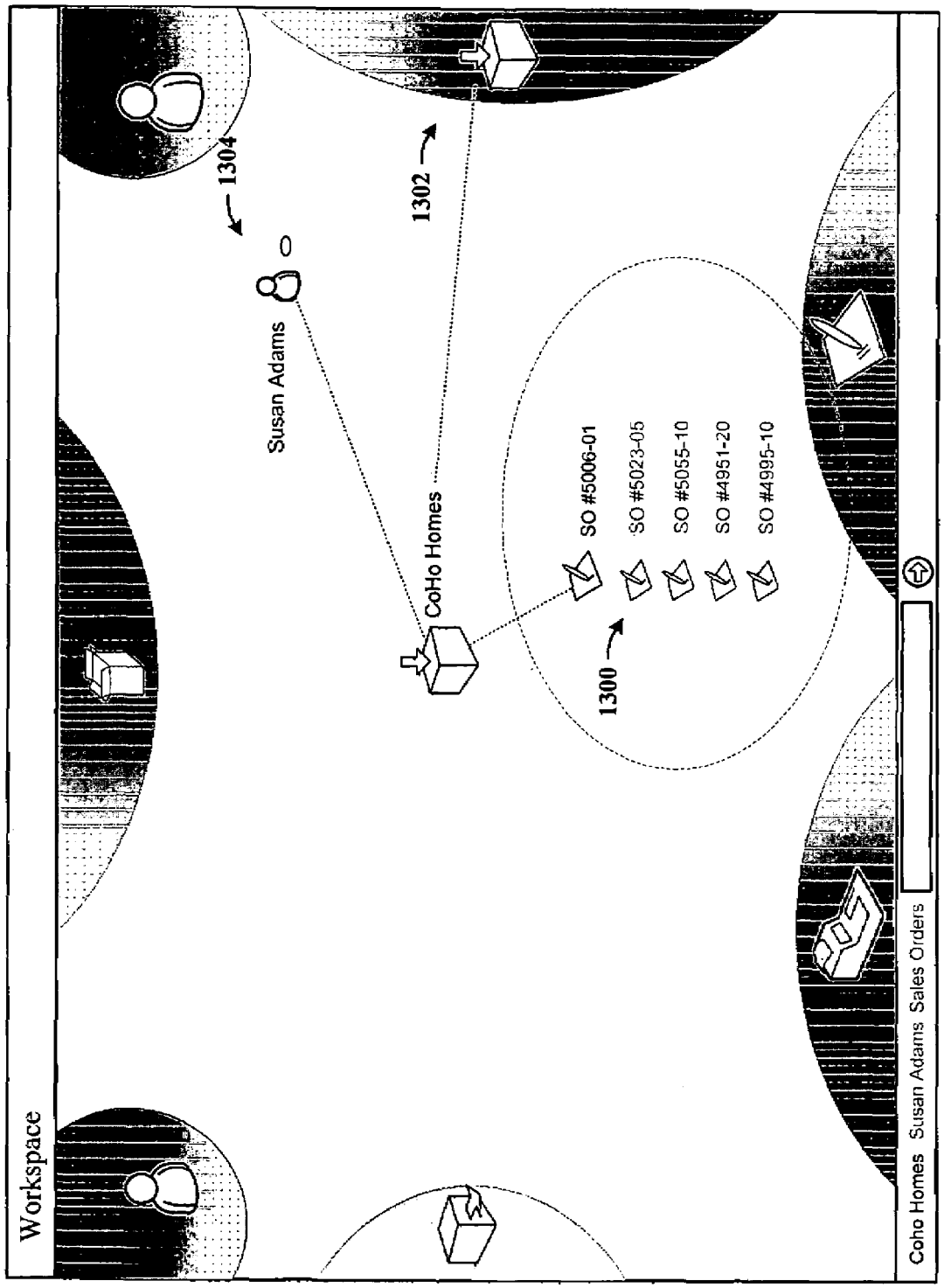
FIG. 13 is a screenshot that displays purchase orders correlated to the customer and the customer contact.

FIG. 13 is a screenshot that displays purchase orders 1300 correlated to the customer 1302 and the customer contact 1304. The purchase orders 1300 appear in order of relevance (relationship), with the most relevant at the top of the list (in a predetermined color, e.g., red), and orders in descending, scrollable list, fading as relevance reduces or as the relationship becomes weaker.

Figure 14:
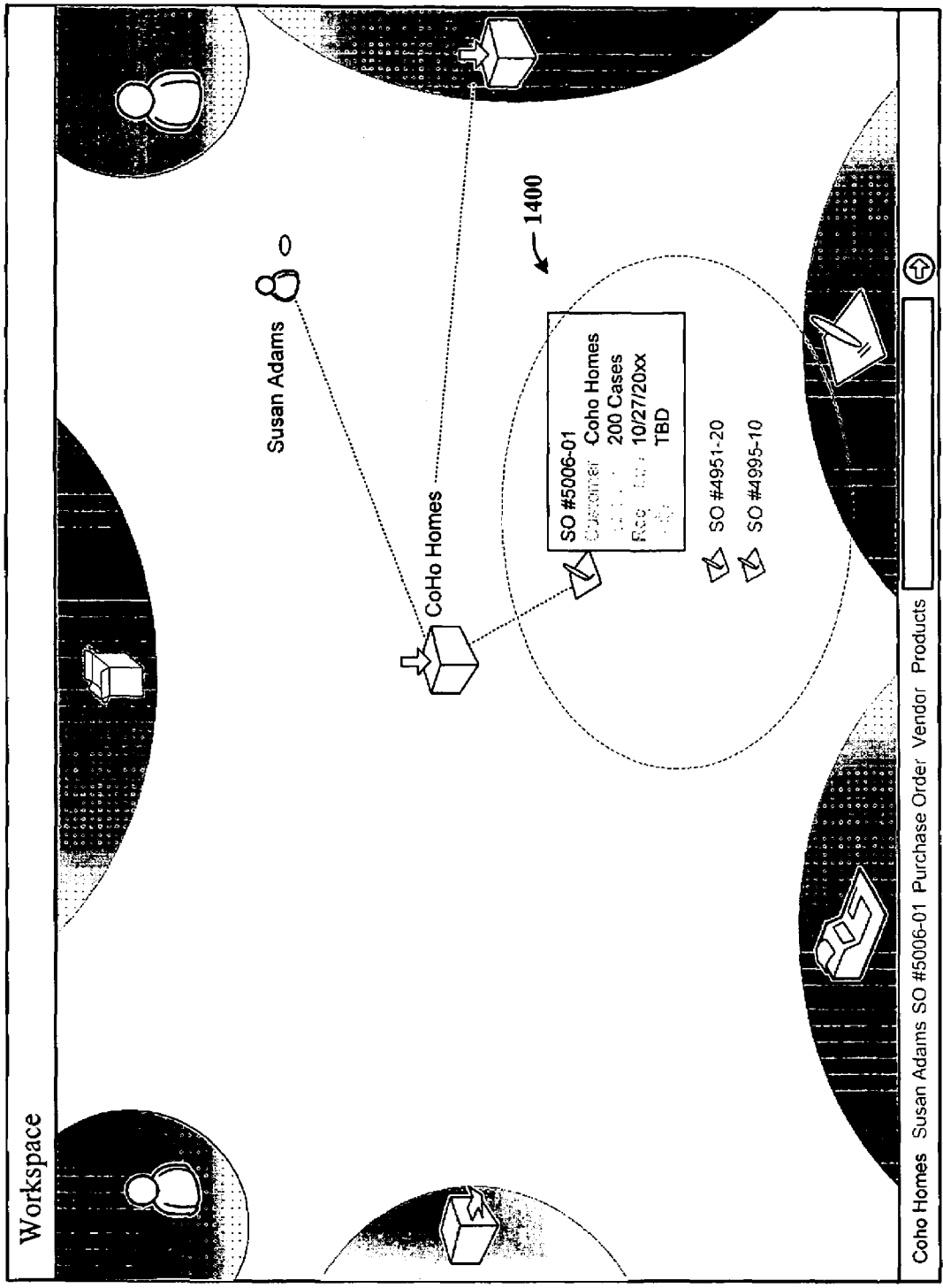
FIG. 14 is a screenshot that displays a top level of information.
Figure 15:
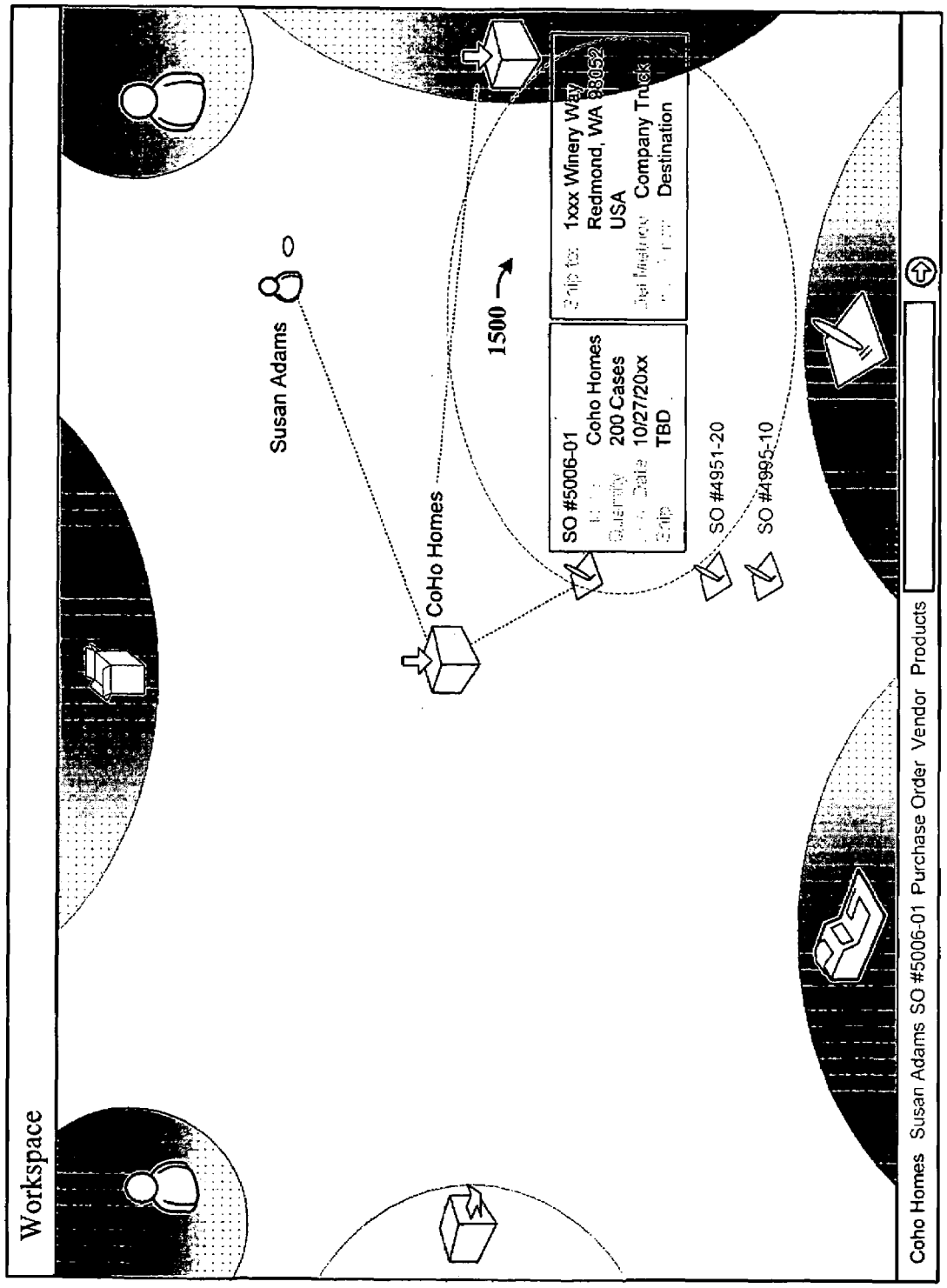
FIG. 15 is a screenshot that displays a secondary level of information.
Figure 16:
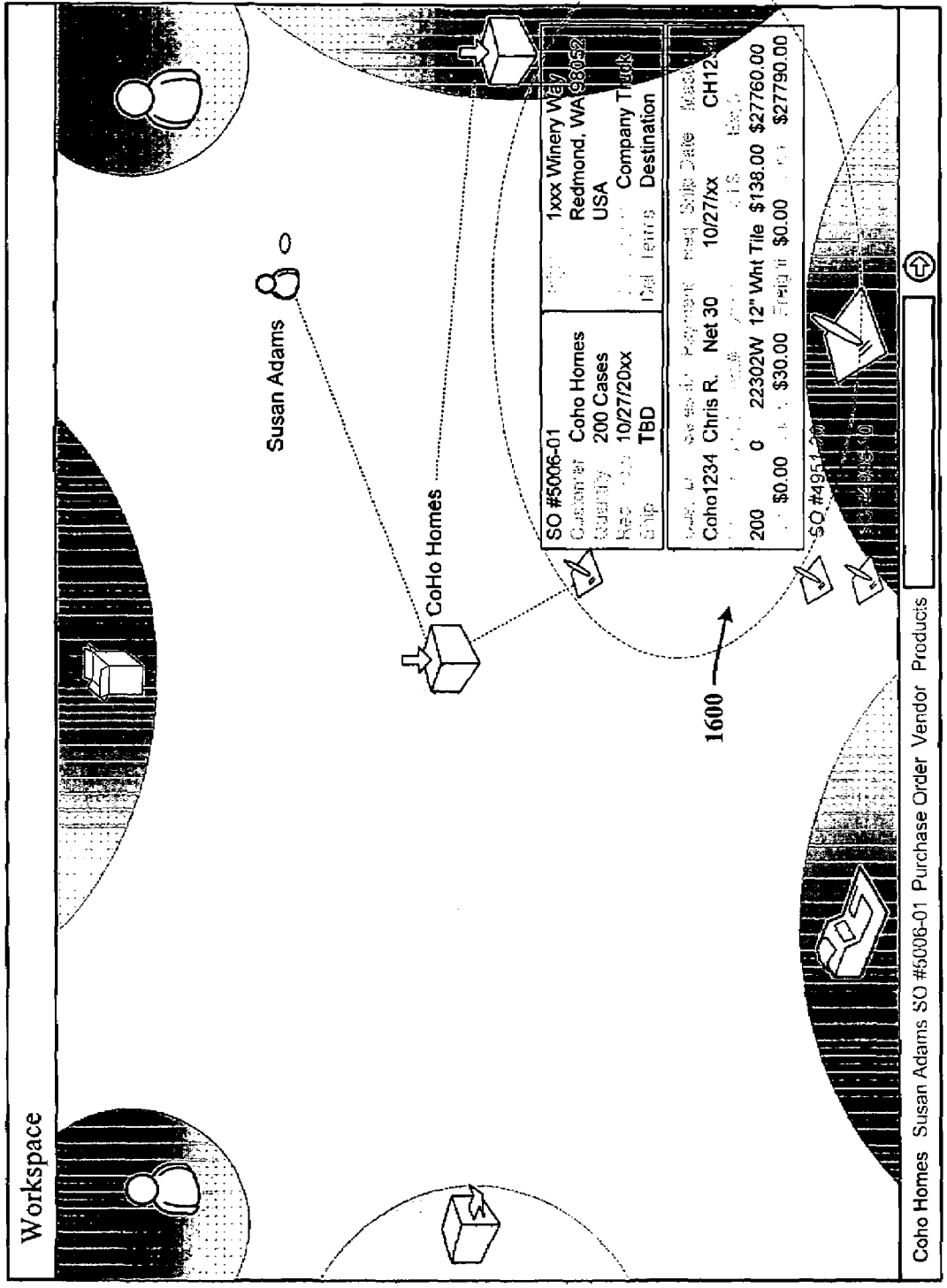
FIG. 16 is a screenshot that displays a third level 1600 of information.

FIGS. 14-16 illustrate screenshots that display layers of purchase order data in a hierarchy. FIG. 14 is a screenshot that displays a top level 1400 of information. FIG. 15 is a screenshot that displays a secondary level 1500 of information. FIG. 16 is a screenshot that displays a third level 1600 of information.

Figure 17:
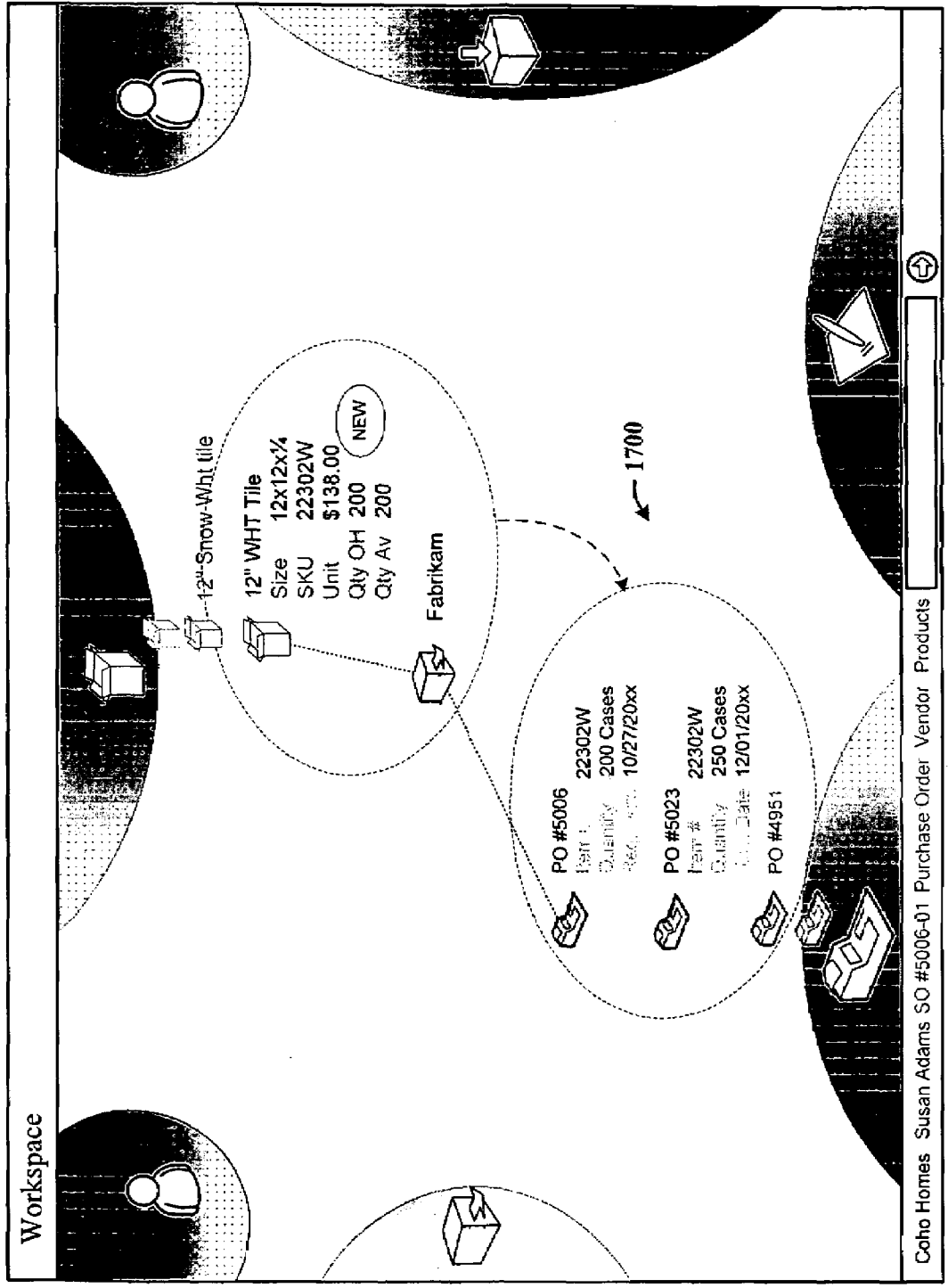
FIG. 17 is a screenshot that demonstrates the use of business rules.

FIG. 17 illustrates a screenshot that demonstrates the use of business rules. In this case, when the preferred supplier fulfills inventory but with insufficient amount, all open orders 1700 for that inventory item display, so that user can easily determine choice of action in terms of manner of order fulfillment.

Figure 18:
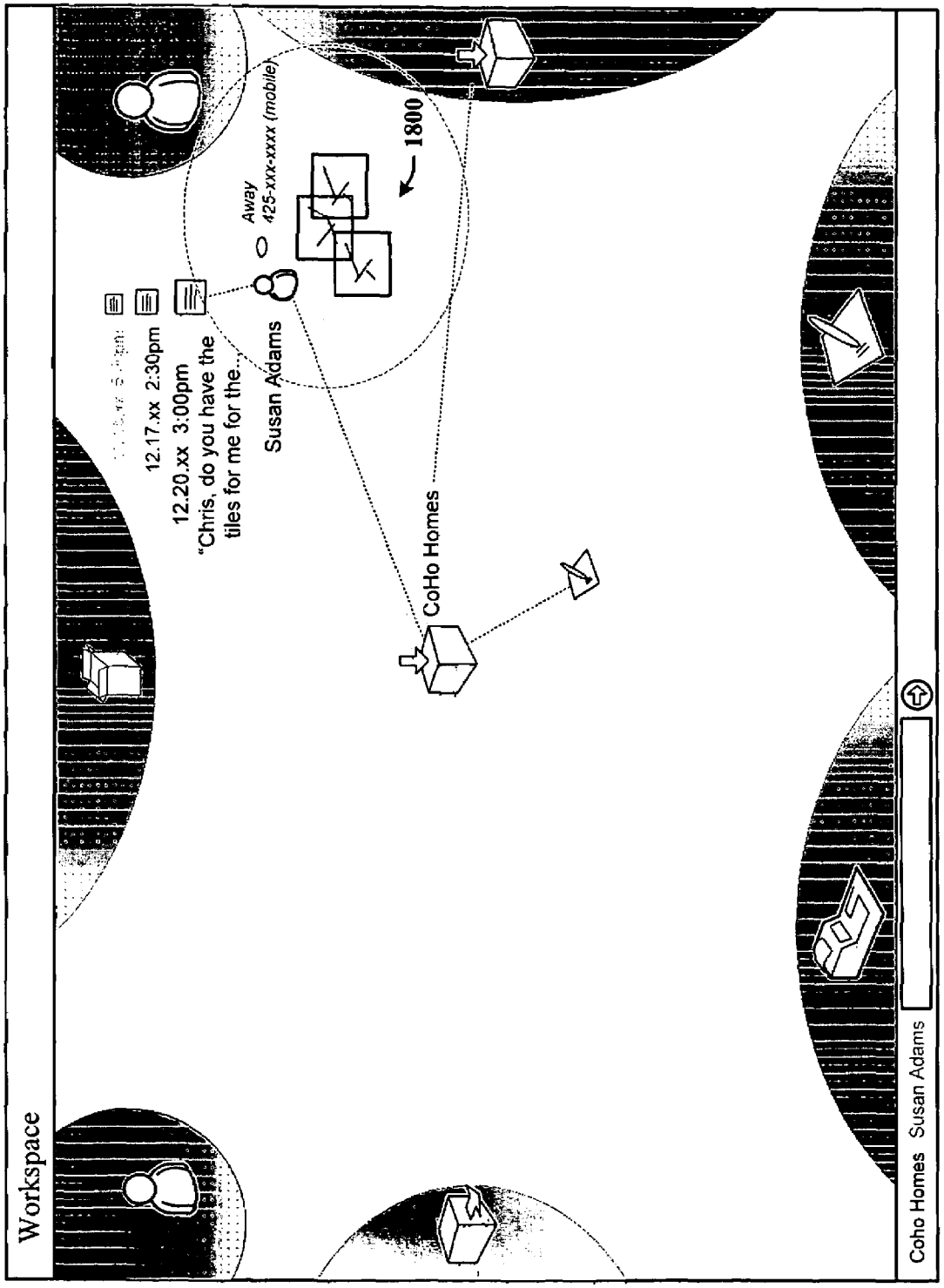
FIG. 18 is a screenshot that demonstrates display of historical activity for a contact.

FIG. 18 illustrates a screenshot that demonstrates display of historical activity for contact (Susan). Below the Susan Adams icon appear related workspaces that occurred in the past (as well as the email correspondence that occurred in the past).

Figure 19:
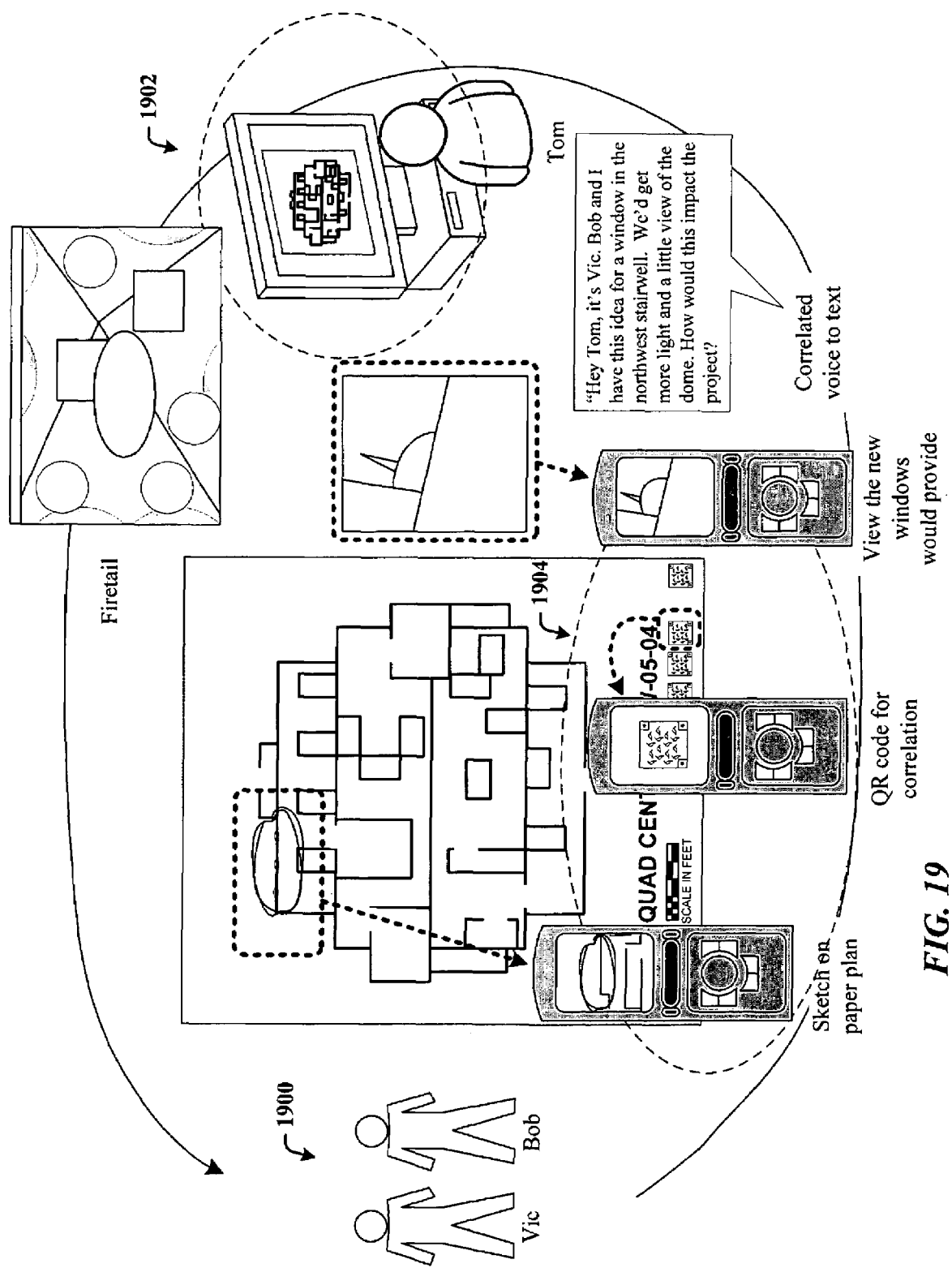
FIG. 19 is a screenshot that illustrates data elevation on a desktop and a cell phone.

FIG. 19 is a screenshot that illustrates data elevation on a desktop and a cell phone. A construction superintendent 1900 on a job site uses a cell phone to transmit to a project manager 1902 an image of a sketched change to a plan and digital image of current construction taken with cell phone's camera. Additionally, a plan page is identified by an RFID (radio frequency identification) tag 1904 is detected by pointing the phone at the plan page. The project manager 1902 views same information on his/her desktop with full application and document functionality.

FIG. 20 is a screenshot of data elevation for a left side workspace supply chain configuration and high-level categories of data elements that can appear and where they would appear. FIG. 21 is a screenshot of data elevation for a left side workspace architecture configuration and high-level categories of data elements that can appear and where they would appear. An administrator can set up templates as a part of the configuration process, which each end user can then personalize.

Figure 22:
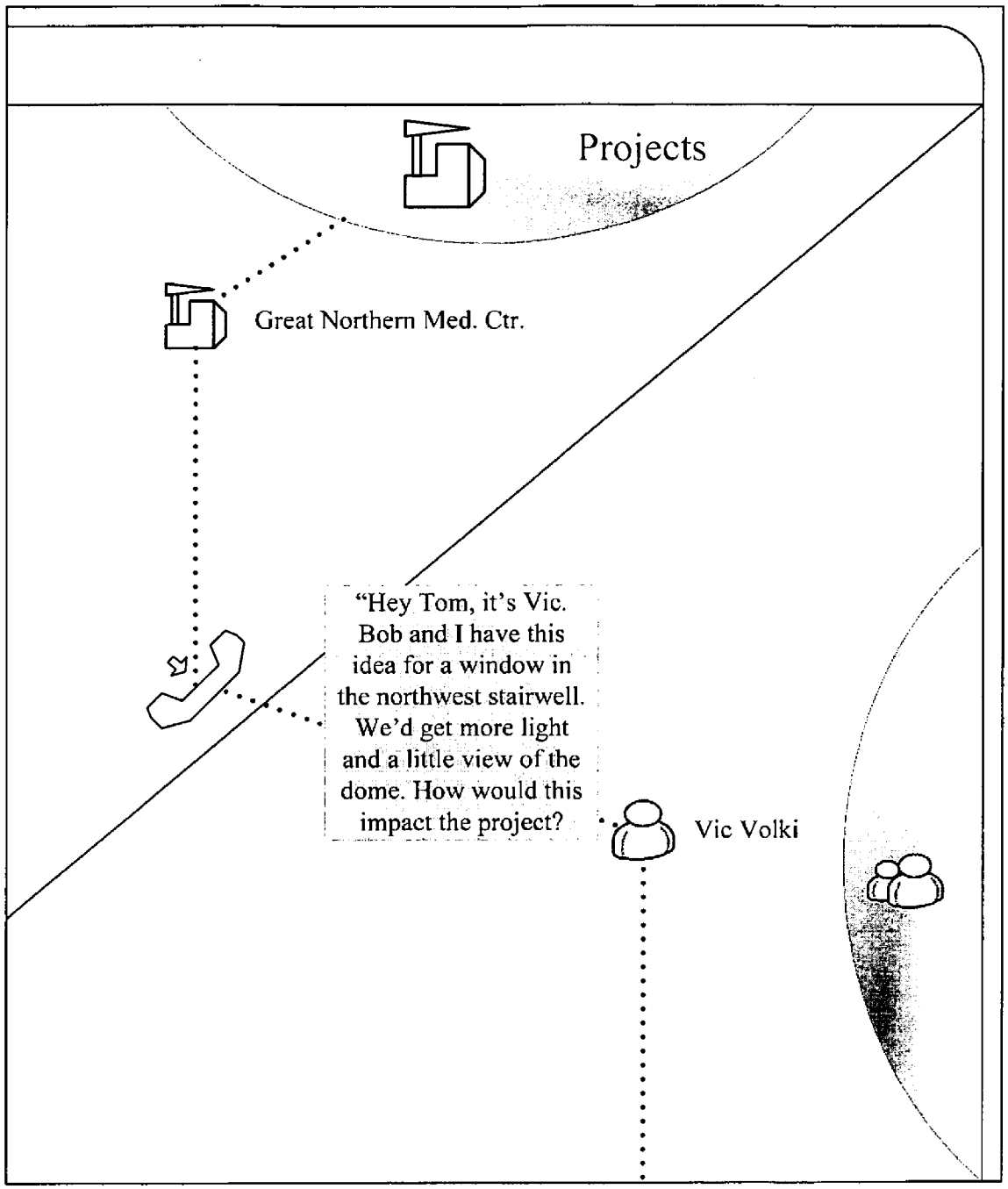
FIG. 22 is a screenshot that illustrates flexible viewing in the context of an external application.
Figure 23:
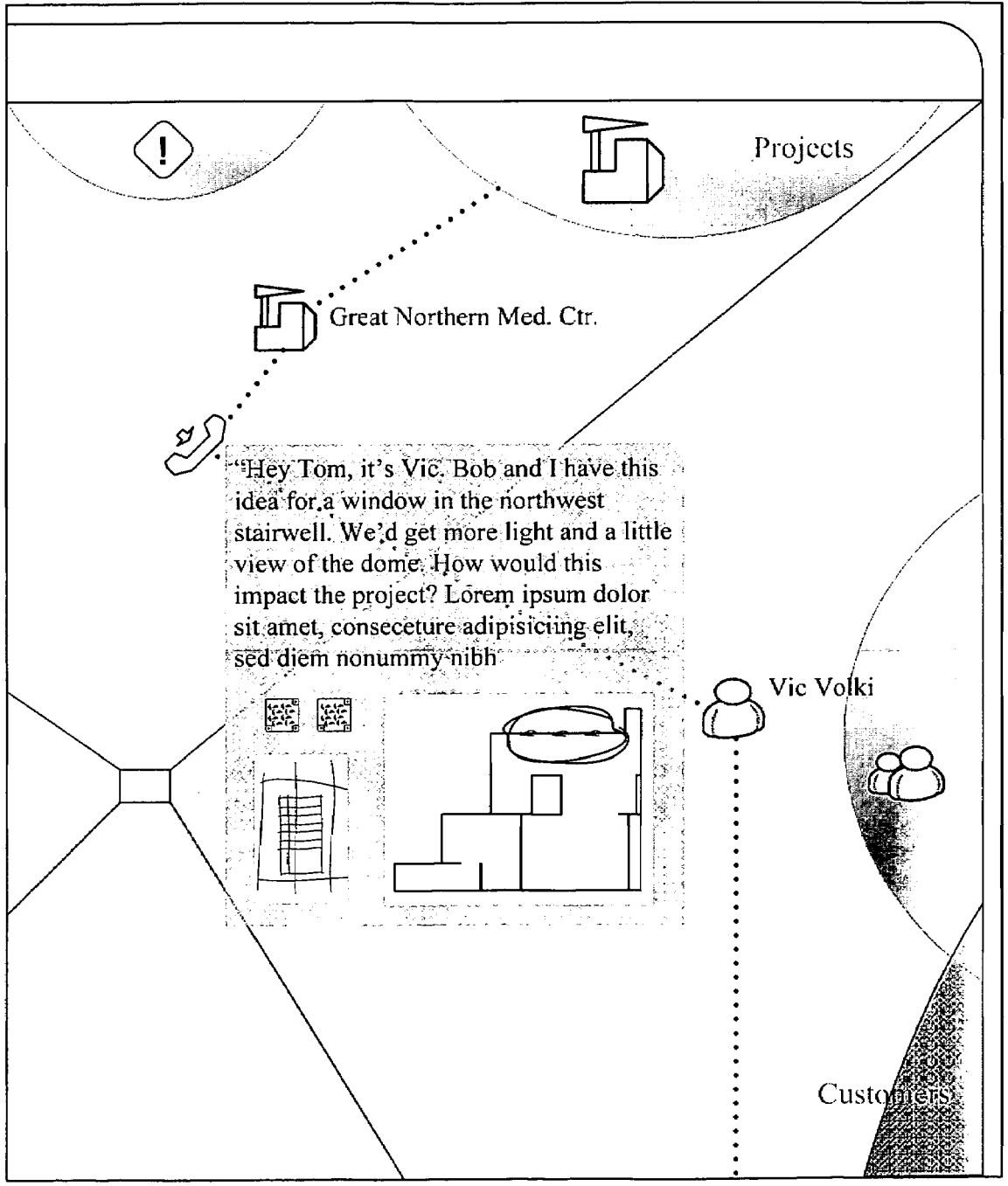
FIG. 23 is a screenshot of another example that illustrates flexible viewing in the context of an external application.

FIG. 22 is a screenshot that illustrates flexible viewing in the context of an external application. Communication text between Tom and Vic is dynamically elevated and presented between the display surface graphical representations. FIG. 23 is a screenshot of another example that illustrates flexible viewing in the context of an external application. The communication text between Tom and Vic is dynamically elevated and presented between the display surface graphical representations, as well as other relevant data exposed manually by selecting a lower-right corner of the graphic.

Figure 24:
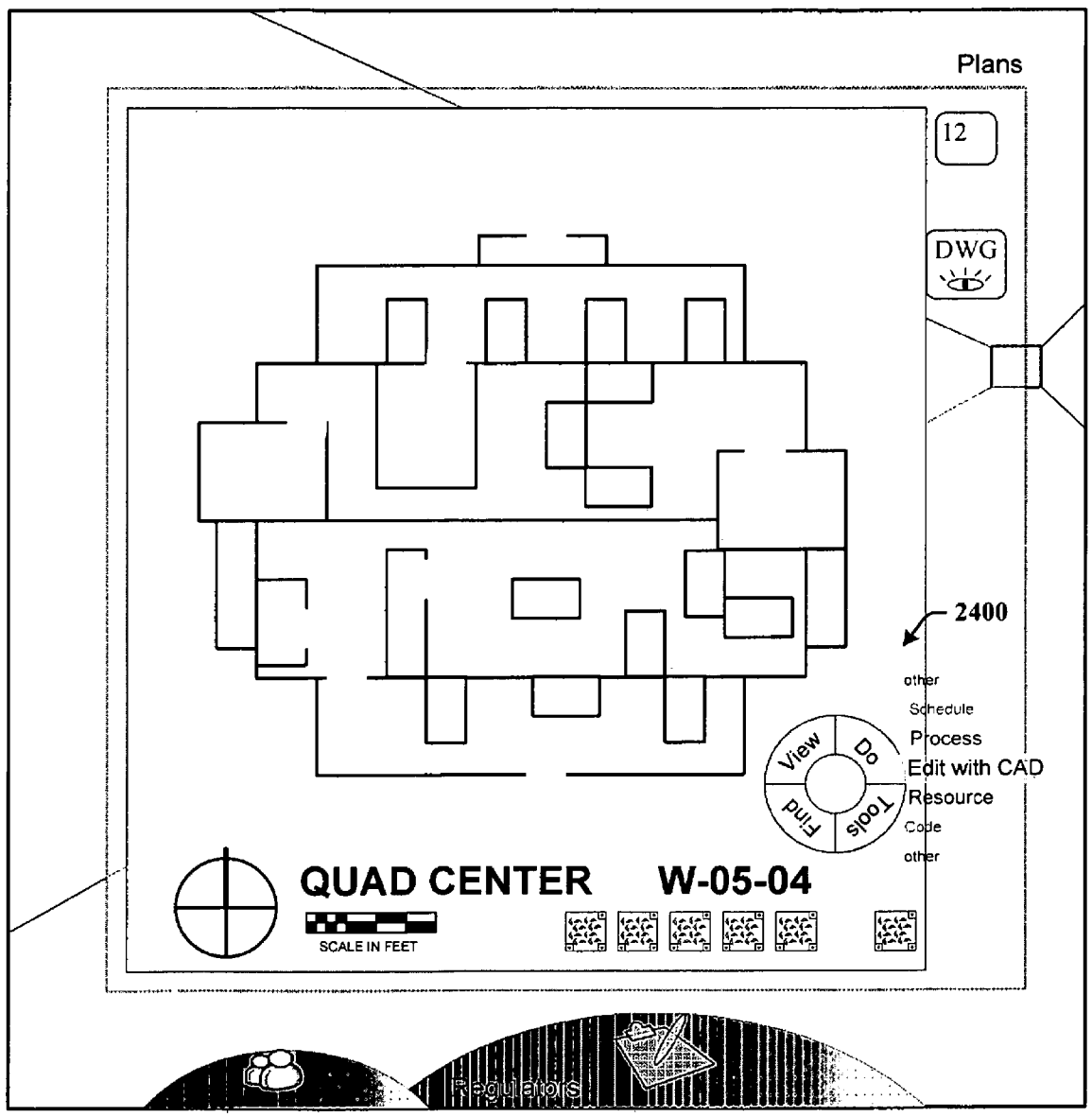
FIG. 24 is a screenshot that illustrates flexible editing in the context of an external application.
Figure 25:
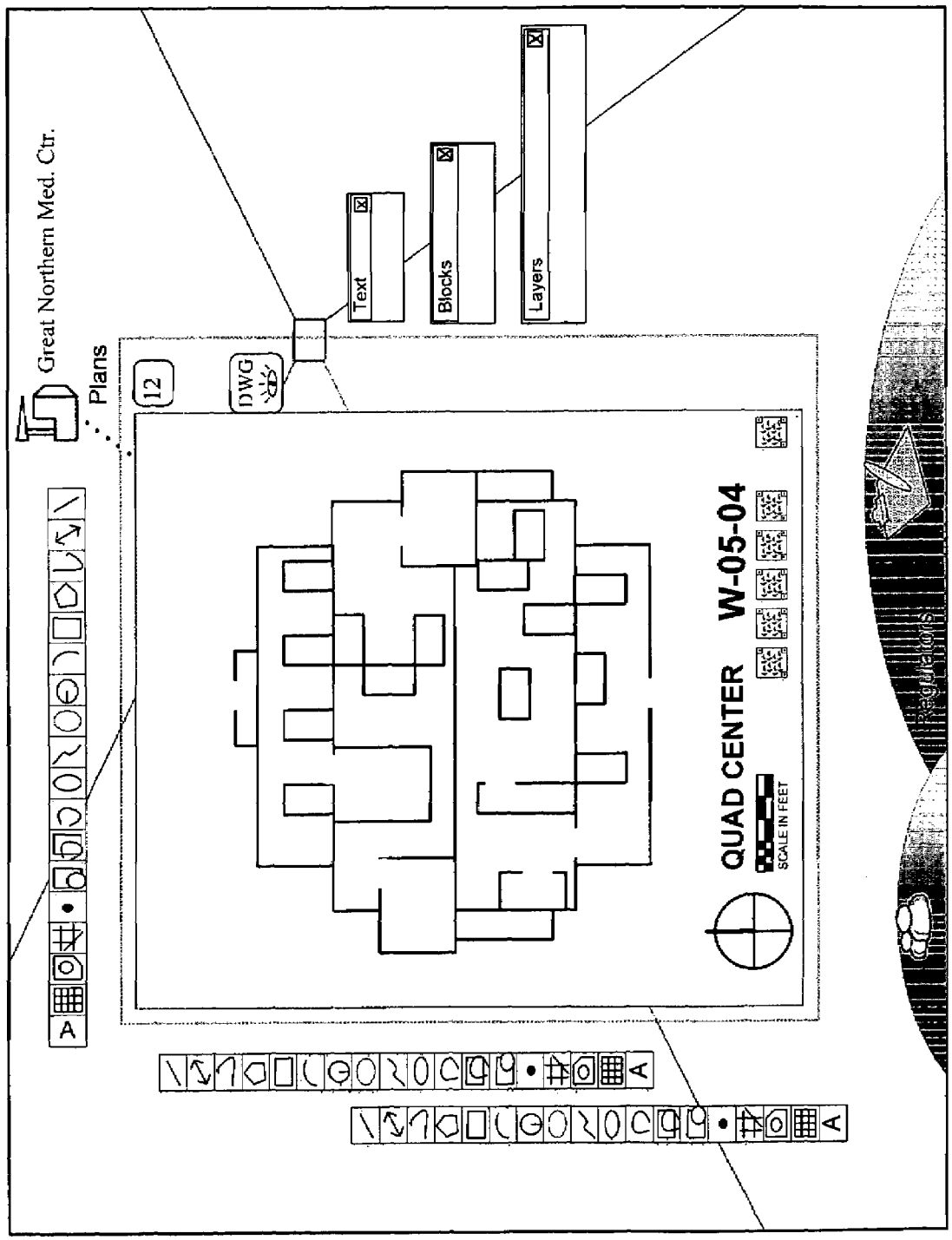
FIG. 25 is a screenshot of another example that illustrates flexible editing in the context of an external application.

FIG. 24 is a screenshot that illustrates flexible editing in the context of an external application. A ring menu 2400 surfaces showing options for selection related to the point of focus or task at hand. FIG. 25 is a screenshot of another example that illustrates flexible editing in the context of an external application. Tool bars are surfaced proximate the graphic.

Figure 26:
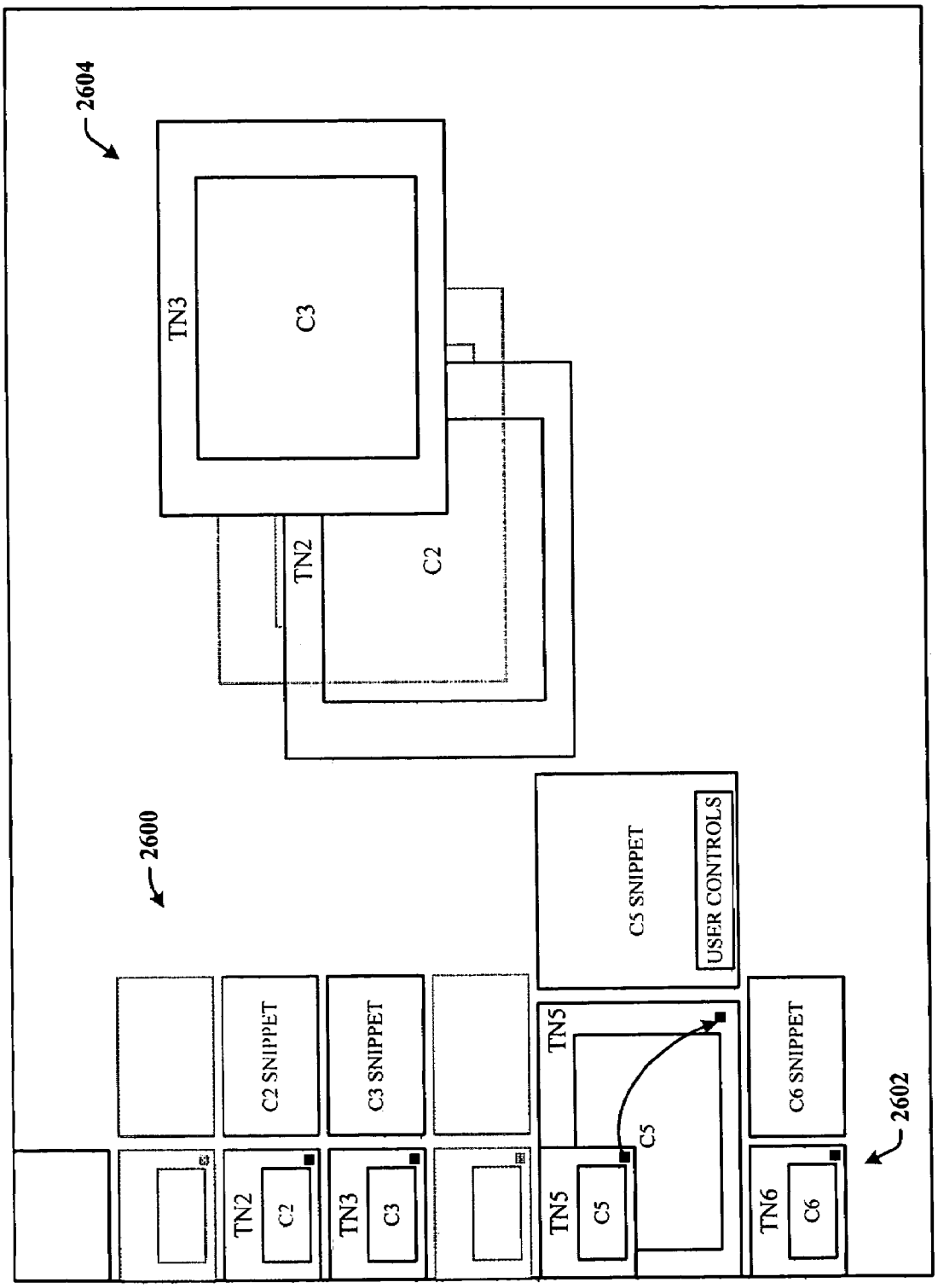
FIG. 26 is a screenshot that illustrates sources relevant to the source in focus, where multiple sources are open.

FIG. 26 is a screenshot that illustrates sources relevant to the source in focus, where multiple sources are open. The related sources 2600 are arranged in order of relevance 2602, with level transparency indicating degree of relationship with the source (most relevant is non-transparent). If a user selects a source related to an open source that is not in focus, a range of bars below the title indicate the degree of relevancy to the source in focus 2604 (thus eliminating the need to resort the list of related sources).

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 27:
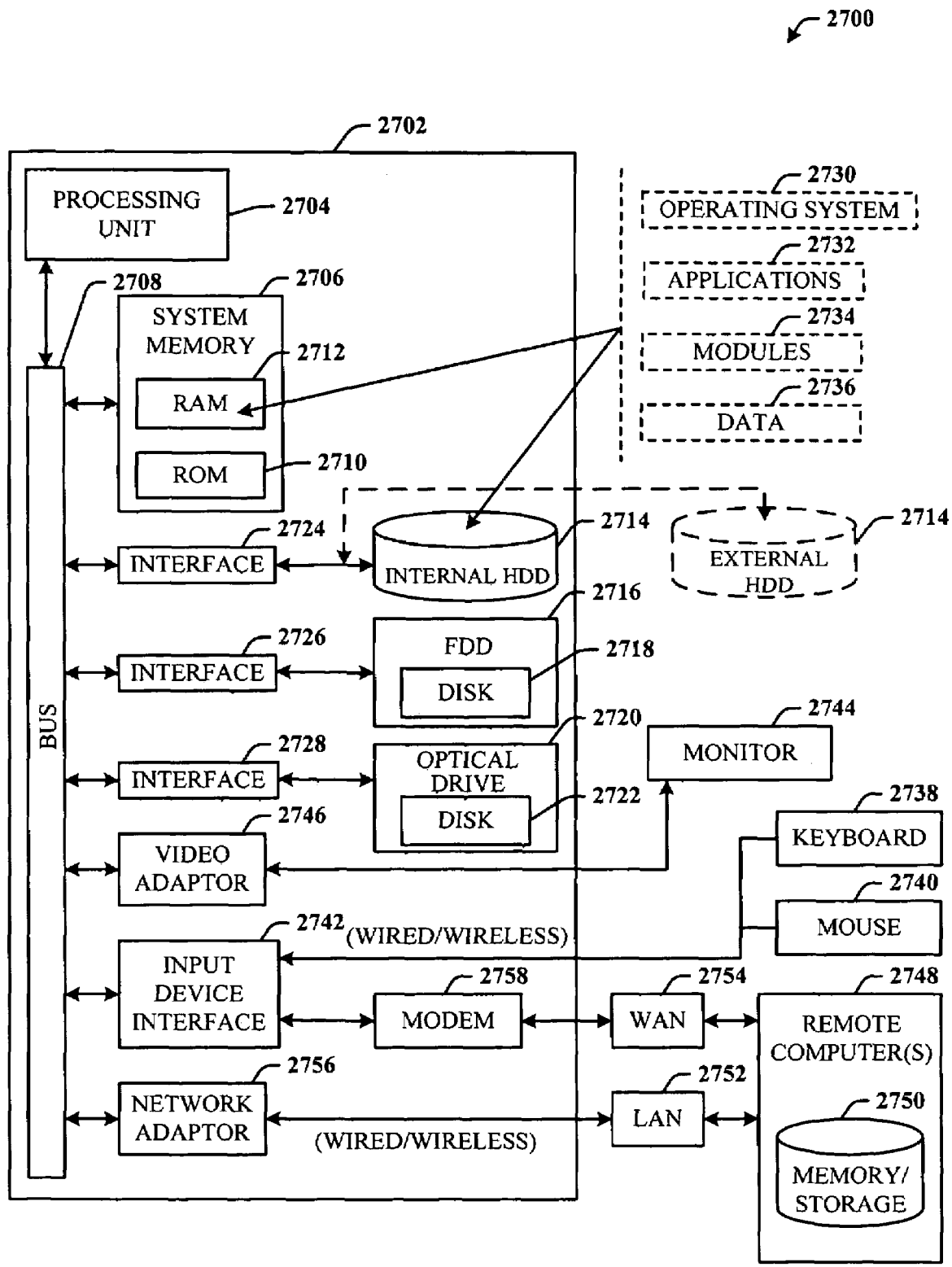
FIG. 27 illustrates a block diagram of a computer operable to execute data elevation in accordance with the disclosed architecture.

Referring now to FIG. 27, there is illustrated a block diagram of a computer operable to execute data elevation in accordance with the disclosed architecture. In order to provide additional context for various aspects thereof, FIG. 27 and the following discussion are intended to provide a brief, general description of a suitable computing environment 2700 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 27, the exemplary environment 2700 for implementing various aspects includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures may also be employed as the processing unit 2704.

The system bus 2708 can be any of several types of bus structure that may further interconnect to a memory bus (with or without a memory controller), a peripheral bus, and a local bus using any of a variety of commercially available bus architectures. The system memory 2706 includes read-only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2702, such as during start-up. The RAM 2712 can also include a high-speed RAM such as static RAM for caching data.

The computer 2702 further includes an internal hard disk drive (HDD) 2714 (e.g., EIDE, SATA), which internal hard disk drive 2714 may also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 2722 or, to read from or write to other high capacity optical media such as the DVD). The hard disk drive 2714, magnetic disk drive 2716 and optical disk drive 2720 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. It is to be appreciated that the innovation can be implemented with various commercially available operating systems or combinations of operating systems.

A user can enter commands and information into the computer 2702 through one or more wired/wireless input devices, for example, a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 1394 serial port, a game port, a USB port, an IR interface, etc.

A monitor 2744 or other type of display device is also connected to the system bus 2708 via an interface, such as a video adapter 2746. In addition to the monitor 2744, a computer typically includes other peripheral output devices (not shown), such as speakers, printers, etc.

The computer 2702 may operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, for example, a wide area network (WAN) 2754. Such LAN and WAN networking environments are commonplace in offices and companies, and facilitate enterprise-wide computer networks, such as intranets, all of which may connect to a global communications network, for example, the Internet.

When used in a LAN networking environment, the computer 2702 is connected to the local network 2752 through a wired and/or wireless communication network interface or adapter 2756. The adaptor 2756 may facilitate wired or wireless communication to the LAN 2752, which may also include a wireless access point disposed thereon for communicating with the wireless adaptor 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wired or wireless device, is connected to the system bus 2708 via the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies, for example. Thus, the communication can be a predefined structure as with a conventional network or simply an ad hoc communication between at least two devices.

Figure 28:
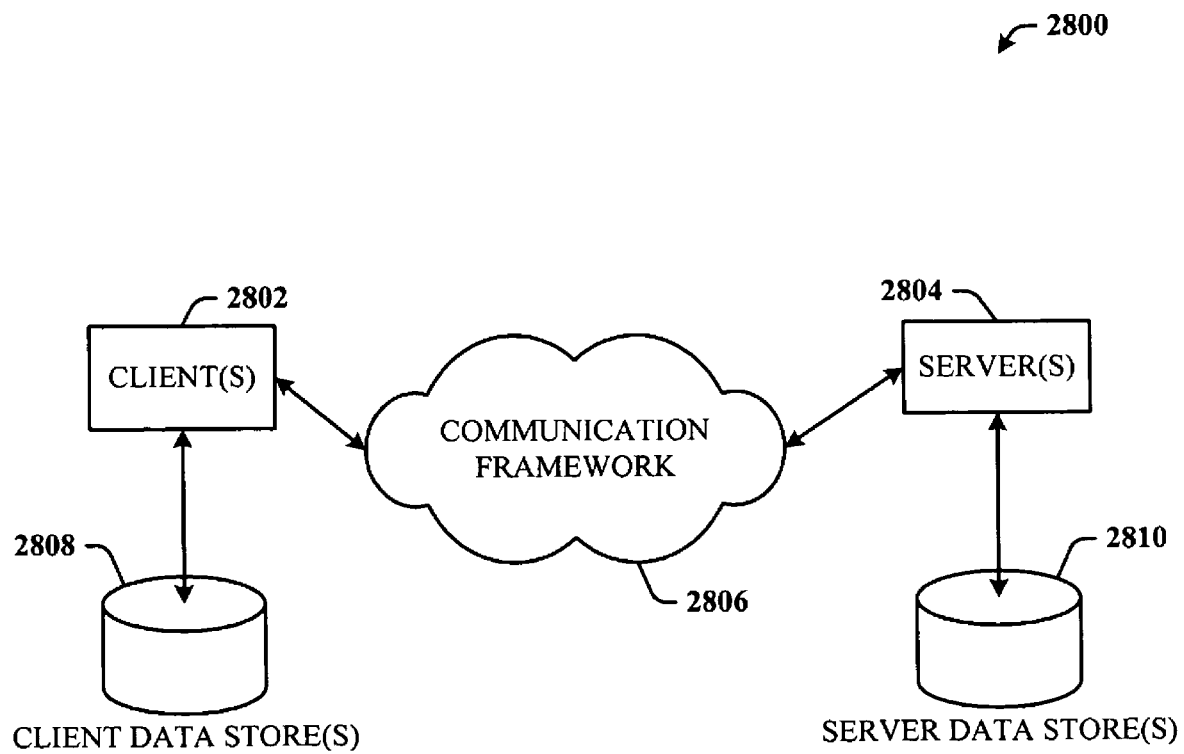
FIG. 28 illustrates a schematic block diagram of an exemplary computing environment that facilitates data elevation in a client/server regime.

Referring now to FIG. 28, there is illustrated a schematic block diagram of an exemplary computing environment 2800 that facilitates data elevation in a client/server regime. The system 2800 includes one or more client(s) 2802. The client(s) 2802 can be hardware and/or software (e.g., threads, processes, computing devices). The client(s) 2802 can house cookie(s) and/or associated contextual information by employing the subject innovation, for example.

The system 2800 also includes one or more server(s) 2804. The server(s) 2804 can also be hardware and/or software (e.g., threads, processes, computing devices). The servers 2804 can house threads to perform transformations by employing the architecture, for example. One possible communication between a client 2802 and a server 2804 can be in the form of a data packet adapted to be transmitted between two or more computer processes. The data packet may include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated via a wired (including optical fiber) and/or wireless technology. The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data handling, the computer-implemented system having a processing unit executing computer-executable components stored in memory comprising:
   a data component associated with a datastore of the computer-implemented system that stores a collection of document data catalogs for providing a comprehensive collection of correlated data, the document data catalogs comprising data elements obtained from existing documents, wherein:
      an existing document is decomposed into a document data catalog for the existing document of corresponding data elements of the existing document according to one or more document templates defining a structure of the data elements of the existing document,
      each corresponding data element of the document data catalog for the existing document comprises a subset of data included in the existing document,
      the document data catalog for the existing document includes element metadata for each of the corresponding data elements of the document data catalog for the existing document,
      the element metadata for each corresponding data element of the document data catalog for the existing document is based on past user interaction with the existing document, and
      the element metadata for the corresponding data elements of the document data catalog for the existing document defines data element relationships and attributes for correlating the corresponding data elements of the document data catalog for the existing document to related data elements of related document data catalogs for different existing documents;
   a data selection component for automatically selecting and elevating a subset of the collection of correlated data based in part on current user activity associated with a core document by:
      selecting a core document data catalog for the core document from the collection of data catalogs and elevating, to a presentation surface, one or more relevant data elements of the core document data catalog based on the element metadata for the corresponding data elements of the core document data catalog in order to display one or more subsets of data included in the core document that are relevant to the current user activity associated with the core document, wherein the element metadata for the corresponding data elements of the core document data catalog is based on past user interaction with the core document, and
      selecting one or more related document data catalogs for different existing documents from the collection of data catalogs and elevating, to the presentation surface, one or more related data elements of the one or more related document data catalogs based on the element metadata for the one or more relevant data elements of the core document data catalog in order to display one or more subsets of data included in the different existing documents that are related to the one or more subsets of data that are relevant to the current user activity associated with the core document, wherein the element metadata for the one or more relevant data elements of the core document data catalog defines data element relationships and attributes for correlating the one or more relevant data elements of the core document data catalog to the one or more related data elements of the one or more related document data catalogs for the different existing documents; and
   an interface component for receiving and dynamically presenting the subset of the collection of correlated data in a user interface, wherein the interface component:
      displays the one or more subsets of data included in the core document that are relevant to the current user activity associated with the core document and the one or more subsets of data included in the different existing documents that are related to the one or more subsets of data that are relevant to the current user activity associated with the core document, and
      enables editing by a user of the one or more subsets of data included in the core document that are relevant to the current user activity associated with the core document and the one or more subsets of data included in the different existing documents that are related to the one or more subsets of data that are relevant to the current user activity associated with the core document for updating the core document and the different existing documents.

2. The system of claim 1, wherein the collection of correlated data of the data component is defined by document data catalogs that prioritize corresponding data elements for selection and elevation.

3. The system of claim 1, wherein the subset of the collection of correlated data is related to a launched application that is part of the current user activity associated with the core document.

4. The system of claim 1, wherein the interface component presents the subset of the collection of correlated data in a dynamic form that enables viewing of the one or more subsets of data included in the core document that are relevant to the current user activity associated with the core document and the one or more subsets of data included in the different existing documents that are related to the one or more subsets of data that are relevant to the current user activity associated with the core document in different formats.

5. The system of claim 4, wherein the interface component presents the subset of the collection of correlated data automatically based on one or more of content, workflow process, and user settings.

6. The system of claim 1, wherein the subset of the collection of correlated data is relevant to the user supplied data that is currently being processed.

7. The system of claim 1, wherein the collection of document data catalogs are for organizing, correlating, and storing data elements and element metadata based on at least one of user permissions and user context.

8. The system of claim 1, further comprising a criteria component for providing criteria that is processed by the data selection component as a basis for selecting the subset of correlated data.

9. The system of claim 8, wherein the criteria component detects display capabilities of a device, and the data selection component selects the subset of correlated data based on the display capabilities of the device.

10. The system of claim 1, wherein the data selection component selects and elevates additional data elements from respective different computing devices for presentation of additional subsets of data in the user interface based on the element metadata for the one or more relevant data elements of the core document data catalog for the core document.

11. A computer-implemented method of handling data, comprising:

decomposing an existing document stored on a computer by specifying application data of the existing document as data elements of the existing document according to a document template defining a structure of the data elements of the existing document, each data element of the existing document comprising a subset of data included in the existing document;

associating element metadata for each of the data elements of the existing document, the element metadata for each data element of the existing document being based on past user interaction with the existing document;

storing the data elements of a core document and the element metadata for the data elements of the core document as a core document data catalog for the core document, wherein the element metadata for the data elements of the core document defines data element relationships and attributes for correlating the data elements of the core document to related data elements of related data catalogs for different existing documents;

storing the core document data catalog for the core document with the related data catalogs for the different existing documents within a datastore of the computer as a collection of data catalogs for providing a comprehensive collection of correlated data;

selecting the core document data catalog for the core document from the collection of data catalogs in response to current application activity with the core document; and dynamically presenting a subset of the collection of correlated data selected and elevated from the collection of the data catalogs based on the current application activity with the core document in a user interface by:

elevating, to a presentation surface, one or more relevant data elements of the core document data catalog based on the element metadata for the data elements of the core document data catalog in order to display one or more subsets of data included in the core document that are relevant to the current application activity with the core document, wherein the element metadata for the data elements of the core document data catalog is based on past user interaction with the core document, selecting one or more related document data catalogs for different existing documents from the collection of data catalogs and elevating, to the presentation surface, one or more related data elements of the one or more related document data catalogs based on the element metadata for the one or more relevant data elements of the core document data catalog in order to display one or more subsets of data included in the different existing documents that are related to the one or more subsets of data that are relevant to the current application activity with the core document, wherein the element metadata for the one or more relevant data elements of the core document data catalog defines data element relationships and attributes for correlating the one or more relevant data elements of the core document data catalog to the one or more related data elements of the one or more related document data catalogs for the different existing documents, and displaying, in the user interface, the one or more subsets of data included in the core document that are relevant to the current application activity with the core document and the one or more subsets of data included in the different existing documents that are related to the one or more subsets of data that are relevant to the current application activity with the core document, wherein the user interface enables editing by a user of the one or more subsets of data included in the core document that are relevant to the current application activity with the core document and the one or more subsets of data included in the different existing documents that are related to the one or more subsets of data that are relevant to the current application activity with the core document for updating the core document and the different existing documents.

12. The method of claim 11, further comprising:

presenting the subset of data elements in a dynamic form populated with the one or more subsets of data included in the core document that are relevant to the current application activity with the core document and the one or more subsets of data included in the different existing documents that are related to the one or more subsets of data that are relevant to the current application activity with the core document, wherein the dynamic form enables viewing of the one or more subsets of data included in the core document that are relevant to the current application activity with the core document and the one or more subsets of data included in the different existing documents that are related to the one or more subsets of data that are relevant to the current application activity with the core document in different formats.

13. The method of claim 11, wherein the subset of the collection of correlated data is related to one or more applications a user has open.

14. The method of claim 11, wherein the one or more subsets of data included in the core document that are relevant to the current application activity with the core document and the one or more subsets of data included in the different existing documents that are related to the one or more subsets of data that are relevant to the current application activity with the core document are associated with corresponding different applications; and further comprising:

inserting the one or more subsets of data included in the core document that are relevant to the current application activity with the core document and the one or more subsets of data included in the different existing documents that are related to the one or more subsets of data that are relevant to the current application activity with the core document into a single form for presentation at a presentation surface based on the current application activity with the core document.

15. The method of claim 11, wherein the element metadata for the data elements of the core document data catalog includes information about at least one of a user, worker usage, point in workflow, and data exceptions.

16. The method of claim 11, further comprising inserting the subset of the collection of correlated data into a dynamic form for presentation at a display surface, wherein the form is manipulable by the user and the collection of correlated data is dynamically presented based on the form manipulation.

17. The method of claim 11, wherein the subset of the collection of correlated data includes at least one of structured data and unstructured data presented dynamically in a form at a point in a workflow.

18. The method of claim 11, further comprising:
elevating one or more additional data elements accessed from respective different computing devices based on the element metadata for the one or more relevant data elements of the core document data catalog for the core document; and
presenting one or more additional subsets of data on a presentation surface of the user interface.

19. The method of claim 11, further comprising presenting the elevated subset of the collection of correlated data on a display surface via a dynamic form that is editable and adaptable at design time and runtime.

20. A computer-readable storage medium storing computer-executable instructions that, when executed by a computing device, cause the computing device to perform a method comprising:
decomposing an existing document stored on a computer by specifying application data of the existing document as data elements of the existing document according to a document template defining a structure of the data elements of the existing document, each data element of the existing document comprising a subset of data included in the existing document;
associating element metadata for each of the data elements of the existing document, the element metadata for each data element of the existing document being based on past user interaction with the existing document;
storing the data elements of a core document and the element metadata for the data elements of the core document as a core document data catalog for the core document, wherein the element metadata for the data elements of the core document defines data element relationships and attributes for correlating the data elements of the core document to related data elements of related data catalogs for different existing documents;
storing the core document data catalog for the core document with the related data catalogs for the different existing documents within a datastore of the computer as a collection of data catalogs for providing a comprehensive collection of correlated data;
selecting the core document data catalog for the core document from the collection of data catalogs in response to current application activity with the core document; and
dynamically presenting a subset of the collection of correlated data selected and elevated from the collection of the data catalogs based on the current application activity with the core document in a user interface by:
elevating, to a presentation surface, one or more relevant data elements of the core document data catalog based on the element metadata for the data elements of the core document data catalog in order to display one or more subsets of data included in the core document that are relevant to the current application activity with the core document, wherein the element metadata for the data elements of the core document data catalog is based on past user interaction with the core document,
selecting one or more related document data catalogs for different existing documents from the collection of data catalogs and elevating, to the presentation surface, one or more related data elements of the one or more related document data catalogs based on the element metadata for the one or more relevant data elements of the core document data catalog in order to display one or more subsets of data included in the different existing documents that are related to the one or more subsets of data that are relevant to the current application activity with the core document, wherein the element metadata for the one or more relevant data elements of the core document data catalog defines data element relationships and attributes for correlating the one or more relevant data elements of the core document data catalog to the one or more related data elements of the one or more related document data catalogs for the different existing documents, and
displaying, in the user interface, the one or more subsets of data included in the core document that are relevant to the current application activity with the core document and the one or more subsets of data included in the different existing documents that are related to the one or more subsets of data that are relevant to the current application activity with the core document, wherein the user interface enables editing by a user of the one or more subsets of data included in the core document that are relevant to the current application activity with the core document and the one or more subsets of data included in the different existing documents that are related to the one or more subsets of data that are relevant to the current application activity with the core document for updating the core document and the different existing documents.

* * * * *